United States Patent [19]

Cain et al.

[11] Patent Number: 4,767,208
[45] Date of Patent: Aug. 30, 1988

[54] SELF LEVELING TRANSMITTER FOR LASER ALIGNMENT SYSTEMS

[75] Inventors: Gary L. Cain, New Carlisle, Ohio; Joseph F. Rando, Los Altos Hills, Calif.; Ted L. Teach; Lawrence J. Meyers, both of Dayton, Ohio; Theodore J. Markley, Randolph, N.J.

[73] Assignee: Spectra-Physics, Inc., San Jose, Calif.

[21] Appl. No.: 69,480

[22] Filed: Jul. 2, 1987

Related U.S. Application Data

[63] Continuation-in-part of Ser. No. 788,800, Oct. 18, 1985, Pat. No. 4,679,937.

[51] Int. Cl.$^4$ .................. G01B 11/26; G01C 9/12
[52] U.S. Cl. ................................. 356/138; 356/149; 356/250
[58] Field of Search ............... 356/138, 148, 149, 152, 356/153, 248, 249, 250; 33/DIG. 21

[56] References Cited

U.S. PATENT DOCUMENTS

| | | | |
|---|---|---|---|
| 3,426,144 | 2/1969 | Roth | 178/6.6 |
| 3,471,234 | 10/1969 | Studebaker | 356/3 |
| 3,485,546 | 12/1969 | Roth | 350/7 |
| 3,588,249 | 6/1971 | Studebaker | 356/4 |
| 3,634,675 | 1/1972 | Madsen et al. | 240/1.2 |
| 3,684,381 | 8/1972 | Zoot | 356/138 |
| 3,820,903 | 6/1974 | Kindl et al. | 356/138 |
| 3,982,839 | 9/1976 | Schwartz | 356/138 X |
| 4,111,564 | 9/1978 | Trice, Jr. | 356/247 |
| 4,221,483 | 9/1980 | Rando | 356/250 |
| 4,674,870 | 6/1987 | Cain et al. | 356/4 |
| 4,679,937 | 7/1987 | Cain et al. | 356/138 |

Primary Examiner—Eugene R. LaRoche
Assistant Examiner—Steven J. Mottola
Attorney, Agent, or Firm—Quarles & Brady

[57] ABSTRACT

A transmitter for an alignment system in which a field of electromagnetic radiation is propagated in a non-planar reference cone is disclosed. The transmitter includes a chassis with a source fixed to the chassis for providing a beam of electromagnetic radiation and an optical deflector which converges toward the source reflects the beam into an omni-directional cone of radiation. A flexible support having an omni-directional stiffness supports the optical deflector in the beam to reflect the reference field in a level orientation when the chassis is level. An angular error in the orientation of the chassis from level results in the optical deflector deviating from the aligned position to maintain the reference field in the level orientation. Damping of the deflector is also provided for and sensors detect when the angular error of the chassis has exceeded an allowable amount.

20 Claims, 13 Drawing Sheets

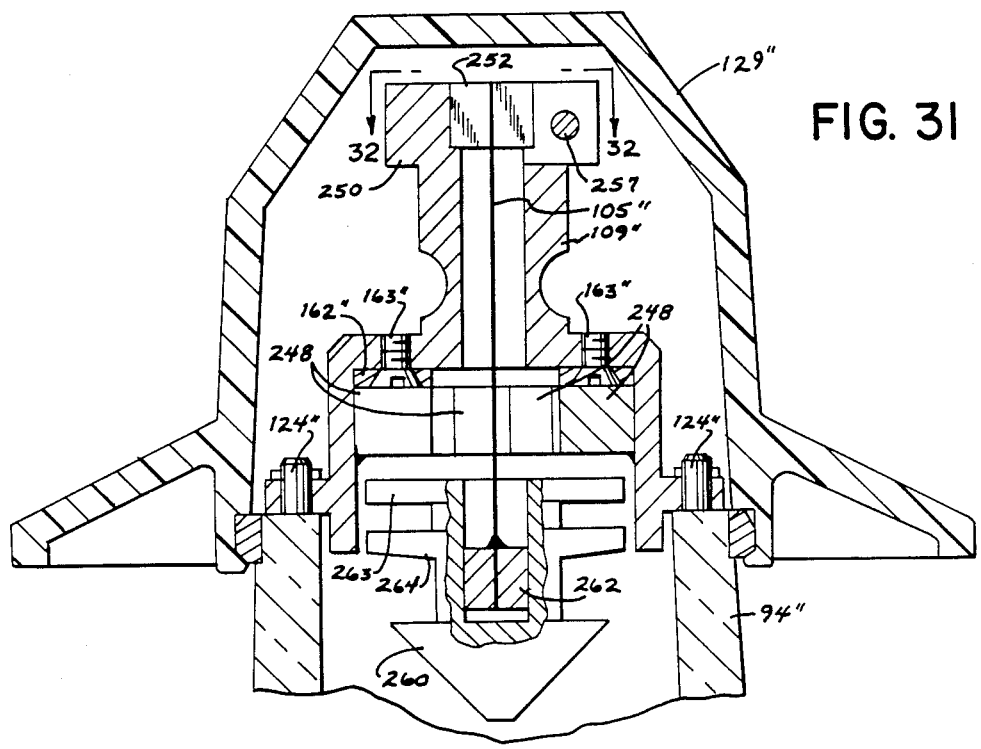
FIG. 31
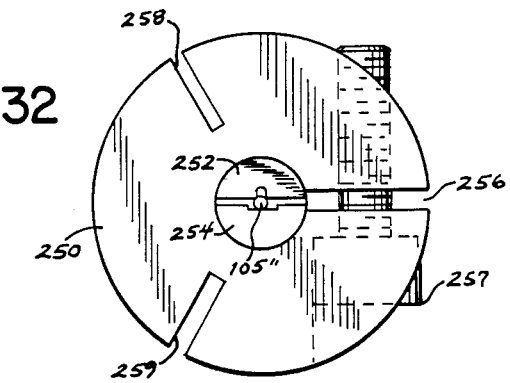
FIG. 32
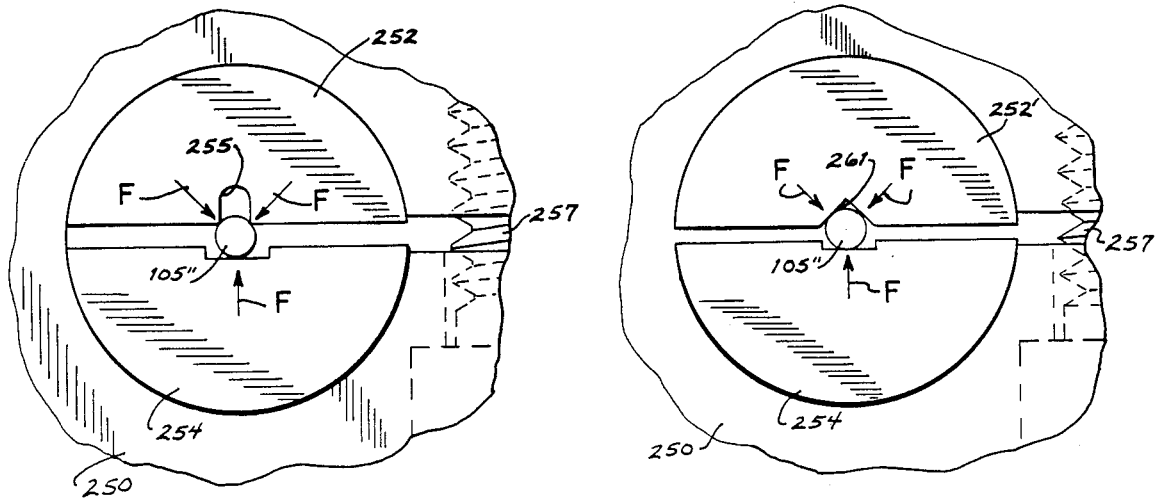
FIG. 33
FIG. 34

SELF LEVELING TRANSMITTER FOR LASER ALIGNMENT SYSTEMS

This is a continuation-in-part of U.S. patent application Ser. No. 788,800 filed Oct. 18, 1985, now issued as U.S. Pat. No. 4,679,937.

BACKGROUND OF THE INVENTION

This invention relates to a transmitter for providing a non-planar reference cone of electromagnetic radiation.

Electromagnetic radiation has been applied in the construction industry to provide a reference for leveling and alignment. It has been found particularly useful because it propagates along a straight line, provides a continuous reference over time, and can be provided in a portable unit. In many applications where two or more workers were required with prior aligning techniques, only one man is now necessary to perform the same task with equal or greater accuracy.

It has often been desirable to have an omni-directional leveling or aligning capability. For example, in hanging a ceiling, installing a computer floor, or in grading a field, it has been desirable to have each point in the ceiling, floor or field be at the same grade.

An omni-direcrional field of radiation has been generated in a plane to provide an omni-directional aligning capability. However, for leveling, the plane must itself be extremely close to level. This is because any error in the level of the plane is amplified by a factor proportional to the distance from the transmitter to where the measurement is being taken. For a reference measurement taken 100 feet from the transmitter, an error in the orientation of the field of only one degree from horizontal results in the reference measurement being 21 inches off from the desired grade, which is almost never acceptable.

Moreover, it is not economically possible to meticulously level the radiation plane at the construction site to provide the desired degree of accuracy with respect to horizontal every different time the transmitter is used. Also, particularly with alignment applications at long distances, an alignment plane is not suitable. Because the earth's surface is curved, an alignment field generated in a horizontal plane can be inaccurate and not appropriate for alignment purposes. Consider the use of a plane of light as an alignment tool at 1,000 ft. Due to the earth's curvature, the alignment error will be 0.284 inches. Instead of creating a horizontal plane, a descending reference cone of electromagnetic energy which substantially follows the earth's curvature may be desirable. Therefore, a need exists for a transmitter which can be quickly and easily set up at a construction site and which will produce a non-planar reference cone, provides alignment, and substantially follows the curvature of the earth to make alignment even more accurate than reference planes.

SUMMARY OF THE INVENTION

The invention provides a transmitter for an alignment system in which a field of electromagnetic radiation is propagated. The transmitter includes a chassis and means for leveling the chassis. A source is fixed to the chassis for providing a beam of electromagnetic radiation. An optical deflector having a reflecting surface which converges toward the source redirects the beam into an omni-directional reference field of radiation. Flexible means having an omni-directional stiffness are connected to the chassis for supporting the optical deflector within the beam in an aligned position relative to the beam with the chassis level. The beam is redirected omni-directionally by the deflector in the aligned position to define a reference field of radiation in a level orientation. An angular error in the orientation of the chassis from level results in the deflector deviating from the aligned position to maintain the reference field in the level orientation.

This arrangement results in the transmitter being self-leveling. For set-up in the field, the transmitter need not be accurately leveled, but need only be leveled within the accuracy range of a bubble-type level indicator. This can be performed quickly and easily. Although leveling with the bubble-type indicator does not result in the transmitter being as accurately level as required for the outgoing reference field, the reference field is nonetheless very accurately level to provide accurate reference measurements even at relatively great distances from the transmitter. Also, if the level of the chassis accidentally changes while the transmitter is in use, the reference field will remain level.

In a preferred form, the optical deflector redirects the beam into a reference field of radiation which is conical in shape and directed downwardly away from the transmitter. Such a reference field more accurately follows the earth's surface than a planar reference field because of the curvature of the earth.

Examples of a support means for a transmitter of the invention include a cantilever strand, a coil spring, a flexible diaphragm arrangement, a double gimbal pivot, and three flexible support members. In any case, the support means has an omni-directional stiffness which is of a magnitude to provide a deviation of the optical deflector from the aligned position to maintain the reference field in the level orientation.

Exemplary means for damping movements of the optical deflector are also disclosed. Movements of the optical deflector may be damped, for example, by a fluid, by magnetic means or with an arrangement to provide viscous air damping. Sensor means are also disclosed for detecting when the angular error in the orientation of the chassis from level is outside of an acceptable range.

It is therefore an object of the invention to provide a transmitter which provides a non-planar reference cone of radiation accurately level with respect to the earth's curvature.

It is another object of the invention to provide a transmitter which can be quickly and easily set up but will still provide an accurately level non-planar reference cone of radiation with respect to the earth's curvature.

It is another object of the invention to provide a durable transmitter of an accurately level non-planar reference cone of radiation.

It is another object of the invention to provide a transmitter of an accurately level non-planar reference cone of radiation which can be inexpensively manufactured.

These and other advantages and aspects of the invention will become apparent from the drawings and from the detailed description.

DESCRIPTION OF THE DRAWINGS

FIG. 31 is a view similar to FIG. 18 but showing an alternate embodiment of connecting a strand to the bob and to a cap;

FIG. 32 is a view of the top of the cap of FIG. 31 taken from the plane of the line 32—32;

FIG. 33 is a detail view illustrating a set of clamping halves for the cap of FIG. 32;

FIG. 34 is a view similar to FIG. 33 of an alternate embodiment of a set of clamping halves for the cap of FIG. 32;

DETAILED DESCRIPTION OF THE PREFERRED EMBODIMENT

Figure 1:
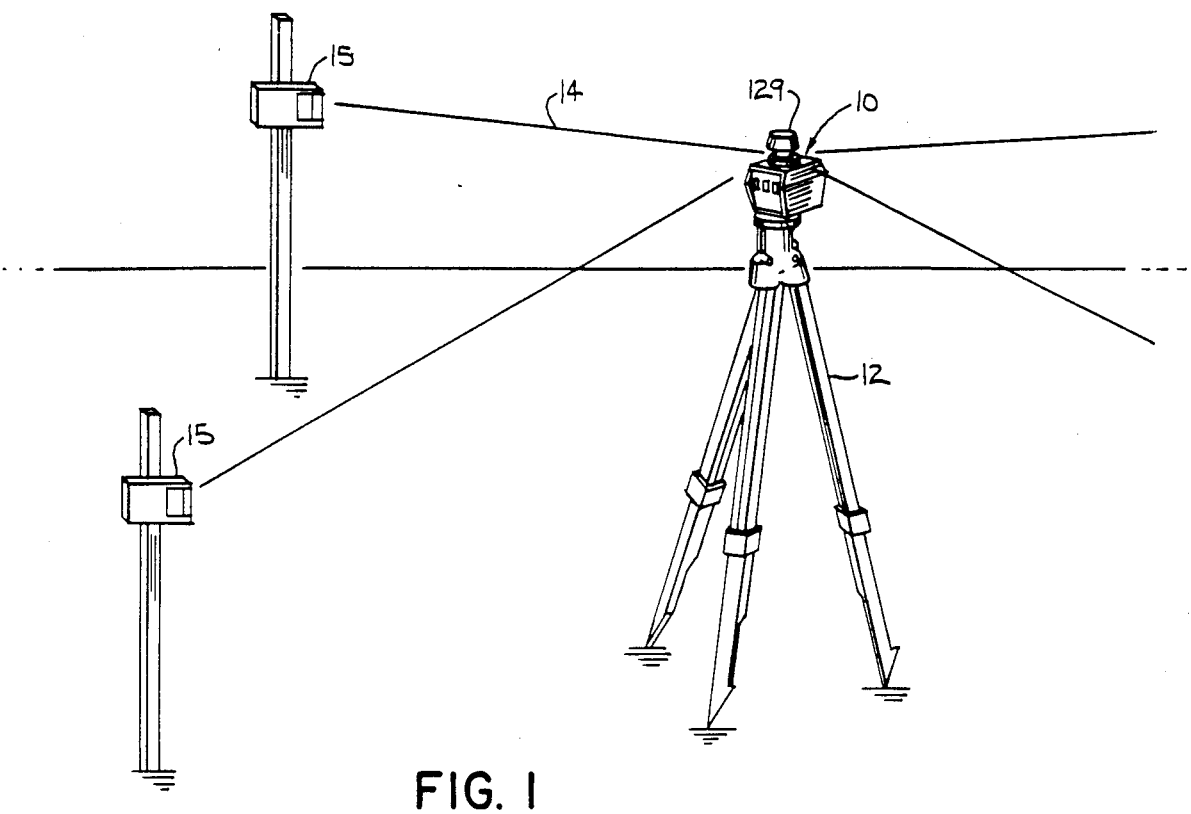
FIG. 1 is a perspective view of a transmitter of the invention in operation.

FIG. 1 shows a transmitter 10 of the invention in operation. The transmitter 10 is level mounted at a desired grade on a tripod 12. The transmitter 10 emits a field of electromagnetic radiation in a non-planar reference cone 14 which declines from the horizontal in an amount sufficient to be substantially equidistant from the earth's surface at each point along the reference cone.

The reference cone 14 is detected by remote receivers 15 to position each receiver 15 at the height of the reference cone 14. Receivers 15 suitable for use with a transmitter 10 of the invention are more fully described in U.S. Pat. No. 4,674,870, issued June 23, 1987 entitled Laser Alignment System With Modulated Field, which was filed on Oct. 18, 1985 and is hereby incorporated by reference.

The reliability of the reference measurements depends upon how level the reference cone 14 is and the distance from the transmitter 10 that the reference measurements are taken. This distance may be on the order of one hundred or more feet. In the same application, the required accuracy may be measured in inches or even fractions of an inch.

Figure 2:
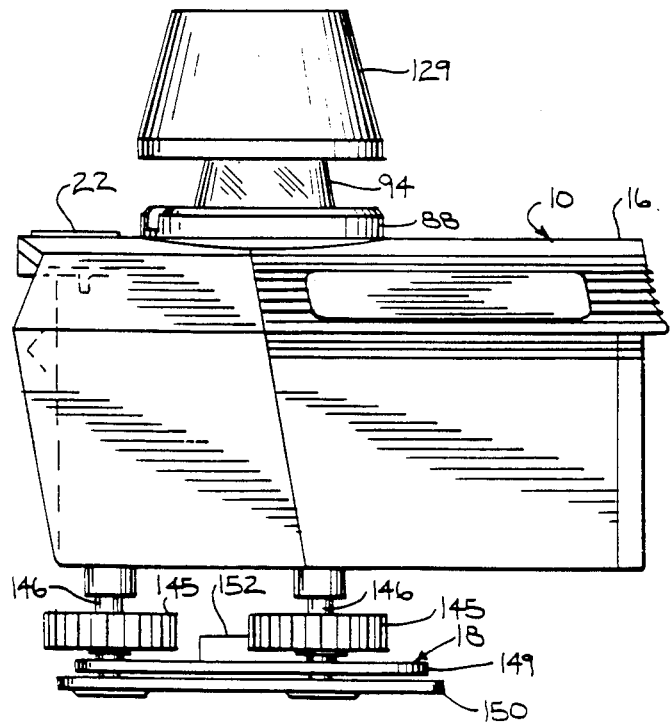
FIG. 2 is a side plan view of the transmitter.
Figure 3:
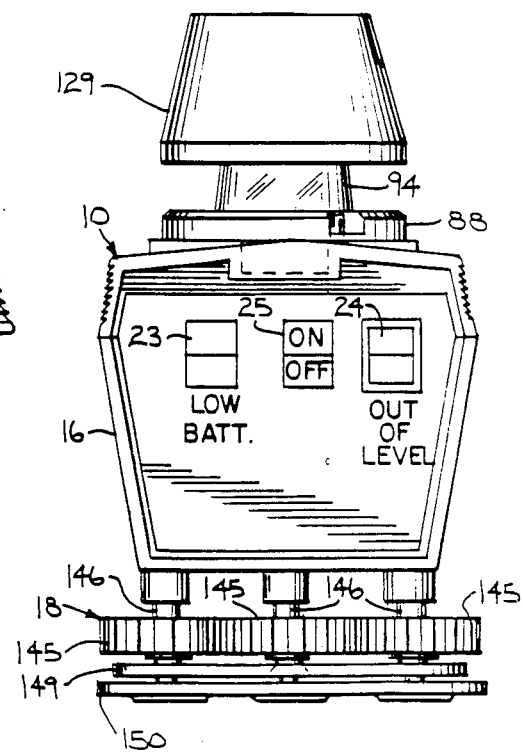
FIG. 3 is a front plan view of the transmitter.
Figure 4:
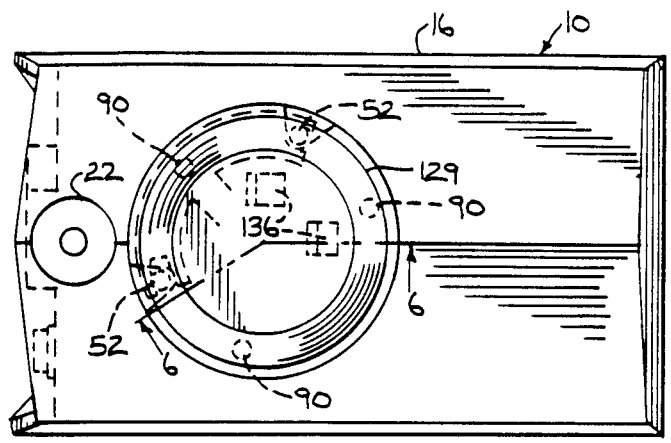
FIG. 4 is a top plan view of the transmitter.

Referring to FIGS. 2 through 4, the transmitter 10 has a chassis 16 which is supported on a leveling base 18. Batteries 20 (shown in phantom in FIG. 5) are stored in the chassis to provide a power supply for the transmitter 10 so that it is portable. A bubble-type level indicator 22 is provided in the chassis 16 for relatively rough leveling of the transmitter 10 by adjusting the mounting base 18. A low battery indicator light 23 and an out of level indicator light 24 are provided on a front panel of the chassis 16 along with an on-off switch 25.

Figure 5:
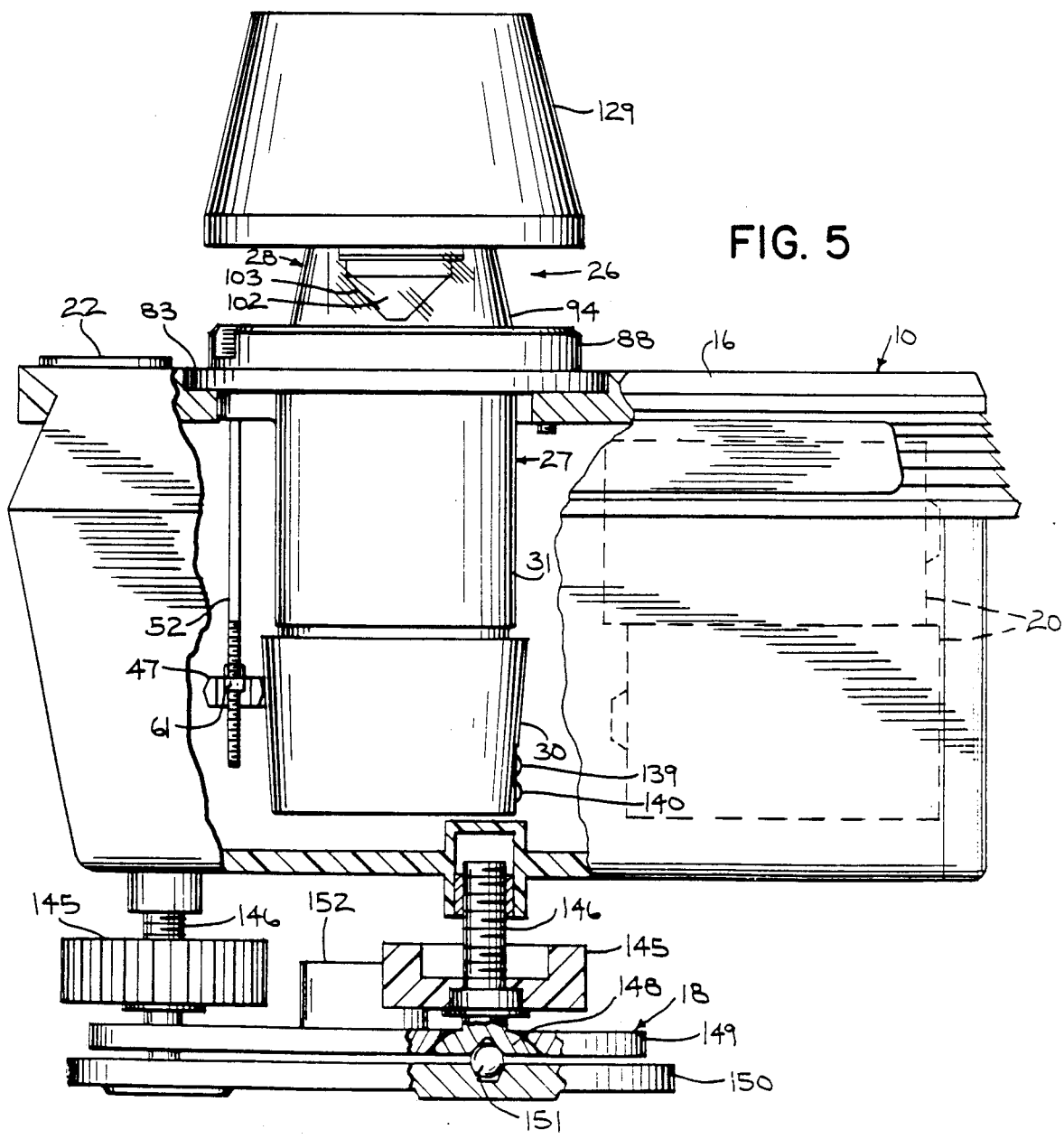
FIG. 5 is a side plan view of the transmitter with portions broken away revealing a lighthouse assembly.
Figure 6:
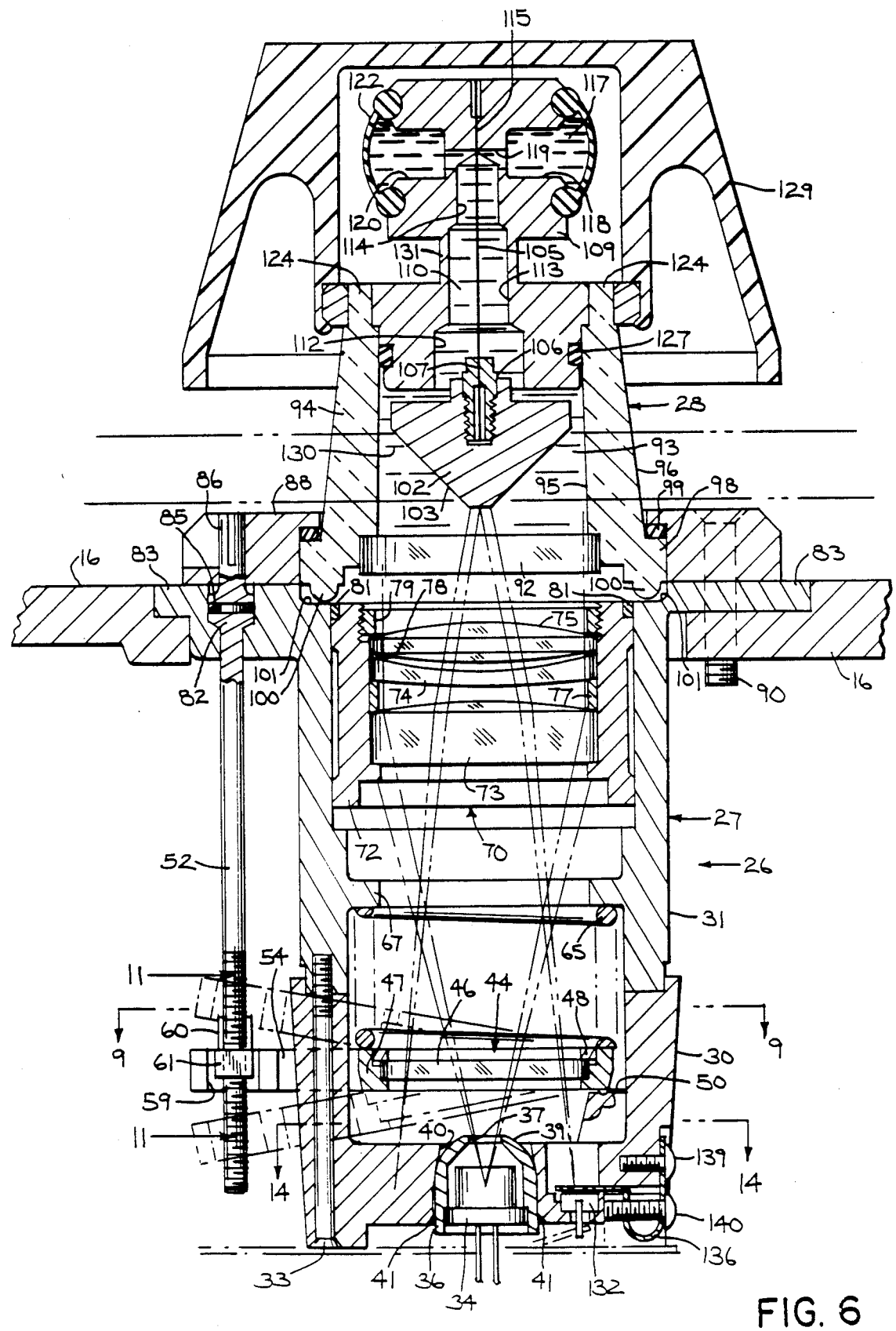
FIG. 6 is a sectional view taken along the line 6—6 of FIG. 4.
Figure 7:
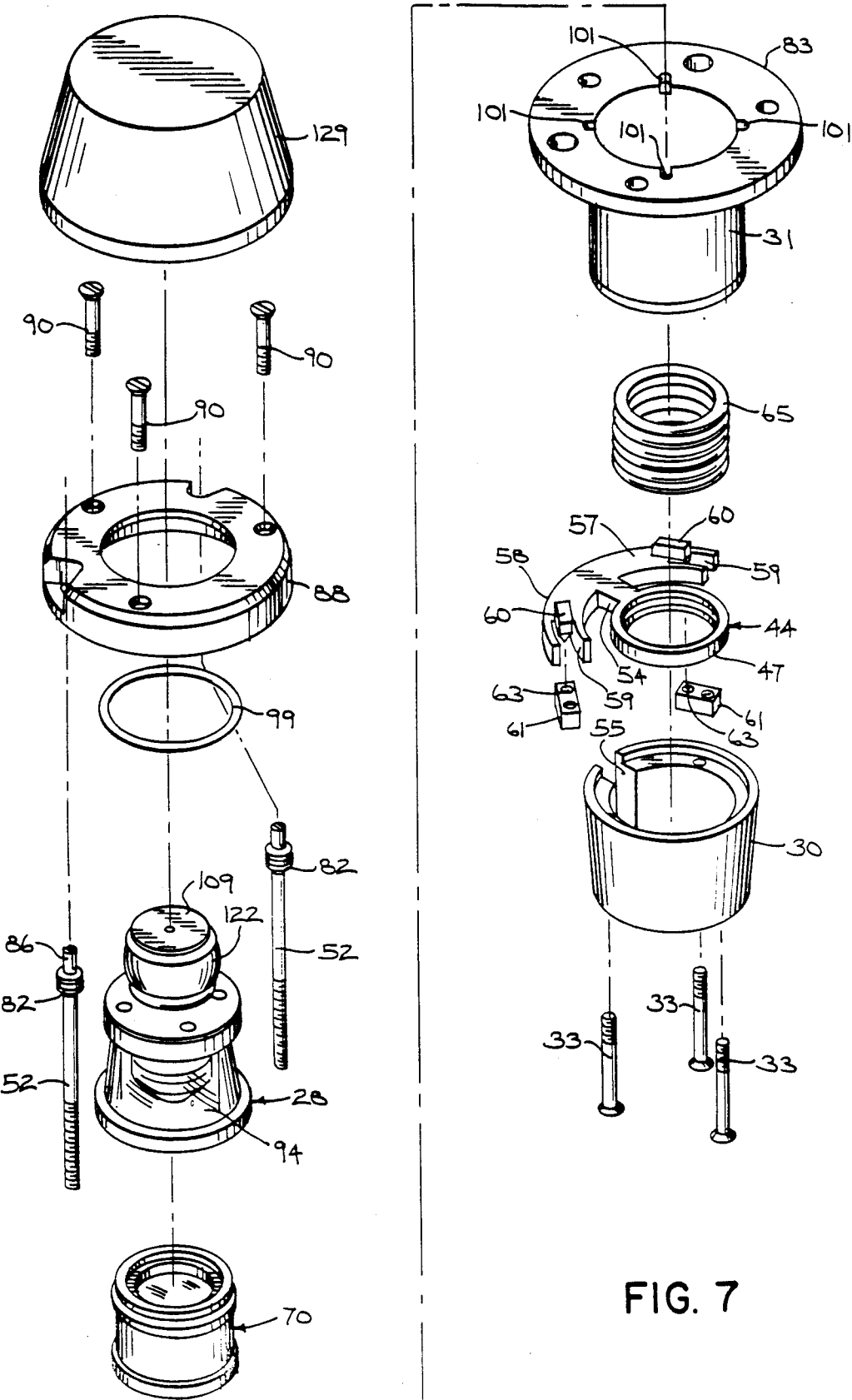
FIG. 7 is an exploded perspective view of the lighthouse assembly.
Figure 8:
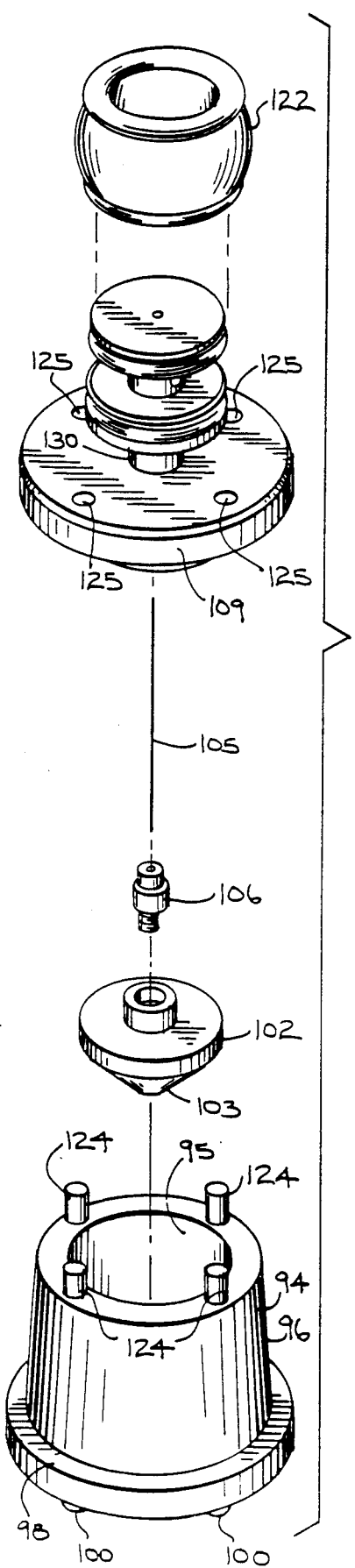
FIG. 8 is an exploded perspective view of a reflector assembly for the lighthouse assembly of FIG. 7.

Referring to FIGS. 5 and 6, a lighthouse assembly 26 which includes a source 27 and an optical compensator or a reflector assembly 28 forms a major component of the transmitter 10. The source 27 provides a substantially collimated beam of electromagnetic radiation into the bottom of the reflector assembly 28. The reflector assembly 28 redirects the substantially collimated beam into the reference cone 14 which emerges conically from the reflector assembly 28 in a downward direction to closely approximate the curvature of the earth.

Figure 14:
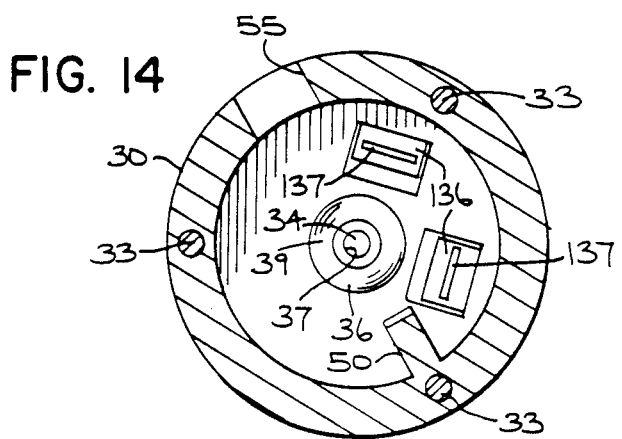
FIG. 14 is a sectional view taken along the plane of the line 14—14 of FIG. 6.

The source 27 includes a lower housing 30 and an upper housing 31. As best shown in FIG. 6, an annular groove in the top of the lower housing 30 receives the lower end of the upper housing 31 and the lower housing is secured to the upper housing with three bolts 33 (FIG. 14). An emitter 34, which in the preferred embodiment is a 3.5 milliwatt laser diode which emits radiation at a nominal wavelength of 780 nanometers, is bonded in a shroud 36. The shroud 36 has an aperture 37 to allow the radiation to propagate from the source and has a frusto-spherical outer surface 39. The frusto-spherical outer surface 39 is received by a conical surface 40 formed in the lower housing 30 to allow aiming of the emitter 34. When the emitter 34 is properly aimed as explained below, the shroud 36 is bonded to the lower housing 30 at 41.

Figure 10:
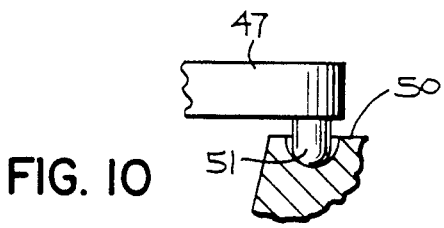
FIG. 10 is a fragmentary detail view of a portion of the assembly shown in FIG. 6.

Radiation from the emitter 34 is next incident upon a steering window 44. The purpose of the steering window 44, is to allow fine adjustments in the aiming of the radiation from the emitter 34. Aiming by the steering window 44 is accomplished by changing the orientation of the steering window to shift the radiation by refraction through a flat lens 46 which is held in a frame 47 by a snap ring 48. The frame 47 is tri-point mounted in the lower housing 30 to enable adjusting the orientation of the steering window 44. As best shown in FIG. 10, a ledge 50 is formed in the lower housing 30 which has an upwardly opening recess into which a rounded projection 51 of the frame 47 fits with enough clearance to allow the steering window to be tilted. The other two pivot points are provided by a pair of adjusting screws 52.

Figure 9:
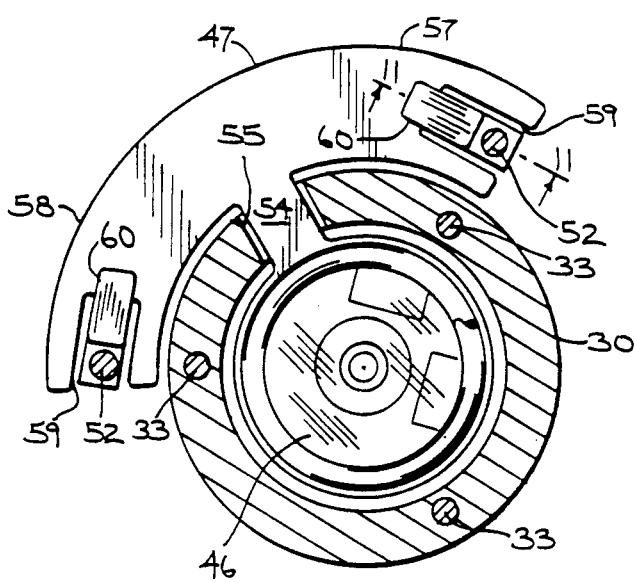
FIG. 9 is a sectional view taken along the plane of the line 9—9 in FIG. 6.
Figure 11:
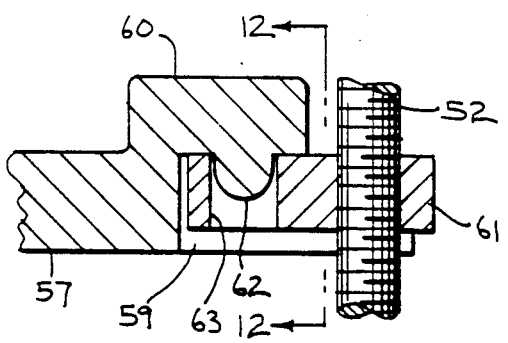
FIG. 11 is a sectional view taken along the plane of the line 11—11 of FIG. 6.
Figure 12:
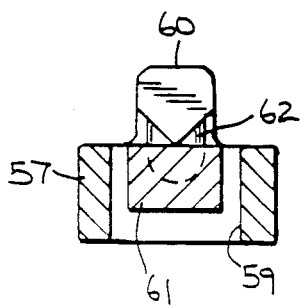
FIG. 12 is a sectional view taken along the plane of the line 12—12 of FIG. 11.

As shown in FIG. 9, the frame 47 has a neck 54 which extends through a slot 55 in the lower housing 30. Arms 57 and 58 extend from each side of the neck 50 over to the adjusting screws 52. The end of each arm 57 and 58 has a slot 59 as best shown in FIGS. 11 and 12 and a knife edge structure 60 is formed on each arm which overhangs the slot 59. Each adjusting screw 52 is threaded into a block 61 which fits within one of the slots 59 and bears against the knife edge. The knife edge structure 60 is also provided with a nipple 62 which fits into a hole 63 in the block 61 with sufficient clearance to allow tilting of the steering window 44. A compression spring 65 is provided between the steering window 44 and a flange 67 of the upper housing 31 to bias the steering window downwardly.

After passing through the steering window 44, the radiation is incident upon a collimating lens assembly 70 disposed in the upper housing 31. The collimating lens assembly 70 redirects the incoming, diverging radiation to propagate substantially parallel to a beam axis, which is parallel to the longitudinal axis of the lens assembly 70. The collimating lens assembly includes a sleeve 72, three lenses 73, 74 and 75, spacers 77 and 78 between the lenses, and a collar 79 to hold the lenses in the sleeve 72. Collimating lenses of the type shown are well known in the optics art and are commercially available from sources such as Universe Kogaku (America), Inc., Glenn Cove, N.Y. 11542. The lens assembly 70 is slidable within the upper housing 31 to enable focusing. When the lens assembly 70 is properly focused, the sleeve 72 is bonded to the upper housing at 81.

The adjusting screws 52 each have a shoulder 82 received by a flange 83 of the upper housing. The shoulder 82 has a groove within which an O-ring 85 is disposed to hold the adjustment of the adjusting screw 52 against vibration and accidental handling. Slotted ends 86 of the adjusting screws 52 extend up through a retainer ring 88 so that the adjusting screws 52 are accessible from outside the transmitter 10. The retainer ring 88 is bolted to the transmitter 10 by three bolts 90 to secure the source 27 to the transmitter and to clamp the reflector assembly 28 to the source.

The substantially collimated beam enters the bottom of the reflector assembly 28 through a flat lens 92 which seals off an inner space 93 defined by a housing 94. The housing 94 has an inner surface 95, an outer surface 96 and is made of a transparent material such as acrylic.

The housing 94 has a flange 98 which is clamped against the upper housing 31 by the retainer ring 88. An O-ring 99 resides between the flange 98 and the retainer ring 88 to seal the inside of the lighthouse assembly 26 from dirt and moisture. Four equally spaced-apart domes 100 are formed on the lower side of the flange 98 which are received in grooves 101 in the upper housing 31. The grooves 101 are about as wide as the domes 100 but allow the domes to move in the radial direction relative to the upper housing 31. This arrangement allows for thermal expansion and contraction of the housing 94.

The beam from the source 27 is next incident upon a bob 102 disposed in the inner space 93. The bob 102 has a frusto-conical surface 103 which is directed toward the oncoming beam. The beam is reflected by the surface 103 and emerges therefrom conically at an angle to horizontal so that it is not planar but forms a cone within the housing 94, as described below. The bob 102 may be made from aluminum with the conical surface 103 diamond turned to provide a mirror-like finish.

The bob 102 is suspended within the inner space 93 by a cantilever strand 105 which is a 0.009 inch diameter stainless steel wire in the preferred embodiment. The cantilever strand 105 is fixed to the bob by a press fit provided in a fastener 106 which is threaded into the bob 102. The press fit is accomplished by tapering the lower end of the strand 105, inserting the tapered end into the top end of a bore 107 in the fastener 106, the bore 107 being slightly smaller than the untapered diameter of the strand 105. The tapered end is then grasped from the other side of the bore 107 and the strand 105 is pulled into the bore 107 until it interferes with the fastener 106 in the bore 107.

The same connecting process is used to secure the upper end of the strand 105 to a cap 109 which provides a support means for the bob 102. The strand 105 extends up through a longitudinal passageway 110 including the bores 112, 113 and 114 in the cap 109 and is press fitted in a bore 115 by the process described above.

A lateral passageway 117 including the bores 118, 119 and 120 is in communication with the longitudinal passageway 110. A rubber diaphragm 122 seals the lateral and longitudinal passageways from dirt and moisture.

The cap 109 is secured to the housing 94 by four projections 124 which extend up through holes 125 in the cap 109. The ends of the projections 124 are expanded in a staking operation to lock the cap 109 on the housing 94. An O-ring 127 disposed in a groove around the cap 109 seals the inner space 93.

A sunshade 129 is fitted onto the cap 109. The sunshade 129 shields the reflector assembly 28 against non-uniform solar heating to prevent non-uniform thermal expansion of the reflector assembly, which can affect calibration.

To provide a non-planar reference cone which approximates the curvature of the earth, the transmitter 10 is calibrated as follows. First, the longitudinal axis of the collimating lens assembly 70 is aligned with plumb. The top of the cap 109 is then grasped with a suitable tool and bent slightly to align the longitudinal axis of the conical surface 103 of the bob 102 to be plumb so that the longitudinal axis of the lens assembly 70 and conical surface 103 are both parallel and plumb. Bending of the cap 109 is facilitated by the relatively small cross-section of the cap walls at 131.

To provide as much uniformity as practical in the conical-directional energy distribution of the radiation reference cone outgoing from the housing 94, the longitudinal axis of the conical surface 103 must be aligned to the energy center, that is, the beam axis, of the incoming collimated beam when the transmitter 10 is plumb. This is roughly adjusted by aiming the emitter 34 so that the energy detected in each quadrature of the outgoing reference cone is approximately equal to the energy detected in the opposite quadrature. A more precise adjustment is provided by the steering window 44. By turning the adjusting screws 52, the orientation of the steering window is adjusted to determine the amount and the direction that the incoming radiation beam is shifted by refraction as it passes through the lens 46 of the steering window 44. The adjusting screws 52 are turned until the energy detected in each quadrature is as nearly equal to the energy detected in the opposite quadrature as possible.

To calibrate the transmitter to plumb and to align the beam axis of the collimated beam to the axis of the conical surface 103, a single calibration fixture can be used. In its simplest form, the fixture would include four of the receivers 15 described in U.S. Pat. No. 4,674,870 referred to above. The receivers 15 would be spaced equal distances apart from a center in a reference cone, each receiver being separated angularly by 90° from the next adjacent receiver. A fixture adapted to hold the lighthouse assembly 26 plumb would be installed at the center and could be adjustable vertically. The cap 109 would then be adjusted and the vertical height of the fixture adjusted until all four receivers indicated that they were "on grade" which would indicate that the reference cone was in alignment.

To provide an indication of when the energy center of the collimated beam was aligned with the axis of the conical surface 103, the receivers could be modified to indicate the total amount of energy each was detecting. When the total energy detected by each receiver was equal to the energy detected by the 180° opposite receiver, the energy center (beam axis) of the collimated beam would be aligned to the axis of the conical surface 103. Note that the energy detected by 180° opposite receivers is compared because the cross-section of the collimated beam is not necessarily circular, but more likely oval. Also, it may be desirable to repeat the horizontal adjustment after the centering adjustment has been performed for greater accuracy.

The final calibration step would be to install the calibrated lighthouse assembly 26 in the chassis 16 with the collimating lens 70 axis (and also the conical surface 103 axis) plumb. The bubble-type level indicator 22 would then be adjusted to indicate that the transmitter was level.

In the field, the collimating lens axis will not always be plumb. Rather, there will normally be some small error between the collimating lens axis and plumb. However, even a small error can result in faulty reference readings, particularly when the readings are taken at relatively large distances away from the transmitter.

To compensate for error between the collimating lens axis and plumb, a transmitter of the invention is self leveling within an error range about plumb. As noted above, if the collimating lens 70 axis is plumb, the electromagnetic radiation emanating from the housing 94 will be in a non-planar reference cone which approximates the curvature of the earth. If an error develops between the collimating lens axis and plumb, the bob 102 will deflect relative to the collimated beam a certain amount less than the error since the cantilever strand has a finite stiffness. The amount of deflection depends upon the weight of the bob/strand assembly and the stiffness and length of the cantilever strand.

Optimally, the strand 105, screw 106 and bob 102 are chosen to provide a deflection substantially equal to one-half of the error between the collimating lens axis and plumb. With this amount of deflection of the conical surface axis, the axis of the non-planar reference cone 14 will remain plumb so that the reference cone 14 will continue to emanate in its proper orientation to the earth. The reference cone 14 will therefore continue to decline from the horizontal in an amount sufficient to be substantially equidistant from the earth at each point along the reference cone, even if there is an error between the transmitter 10 and plumb. This is because, according to the law of reflection, the angle of incidence equals the angle of reflection. Since a change in the orientation of the bob 102 affects both the angle of incidence and the angle of reflection, the deflection of the bob 102 should be one-half of the error between the transmitter 10 and plumb to provide no change in the orientation of the outgoing reference cone.

It is important that the strand 105 be of the same stiffness in all directions perpendicular to the axis of the strand, that is, omni-directionally. This is important so that the deflection of the bob will be the same for a given error regardless of the direction of the error. Note that the press fit means of mounting the strand to the cap 109 and to the bob 102 helps assure omni-directional uniformity in the stiffness of the strand 105 by preventing kinks or buckling where the strand is attached to the cap 109 and screw 106.

To damp movements of the bob 102, the inner space 93, the longitudinal passageway 110, and the lateral passageway 117 are filled with a transparent fluid 130. The fluid 130 in this embodiment is a viscous liquid, but could also possibly be a gas in an appropriate application. In practice, a silicon fluid sold under the trade designation Dow 200 by Dow Chemical Co. was found suitable. The diaphragm 122 seals the fluid 130 within the reflector assembly 28. Preferably the diaphragm 122 is slightly stressed by the fluid 130 in ambient temperatures so that as the fluid expands and contracts with changes in temperature, the diaphragm prevents any voids forming in the reflector assembly 28.

The fluid 130 used has a density greater than that of air. Therefore the fluid 130 has a buoyant effect upon the bob/strand assembly. This buoyant effect must, of course, be accounted for in matching the bob 102 and strand 105 to provide a deflection of the bob substantially equal to one-half of the error from plumb.

The angle of the conical surface 103 is selected to provide the desired non-planar reference cone of radiation emerging from the housing 94. Due to the effects of refraction as the reflected beam passes from the fluid 130 to the housing 94 and then from the housing 94 to air, the reflected beam will not be at the angle of the reference cone 14 as it passes through the fluid or through the housing as shown by the ray diagram of FIG. 13. Rather, the radiation path through the fluid and the housing 94 forms two cones, each of which diverges upwardly. The cone angle of the bob 102 is therefore dependent upon the indices of refraction of the fluid 130 and of the material of the housing 94, and upon the angles of the inner surface 95 and of the outer surface 96 of the housing 94.

Figure 13:
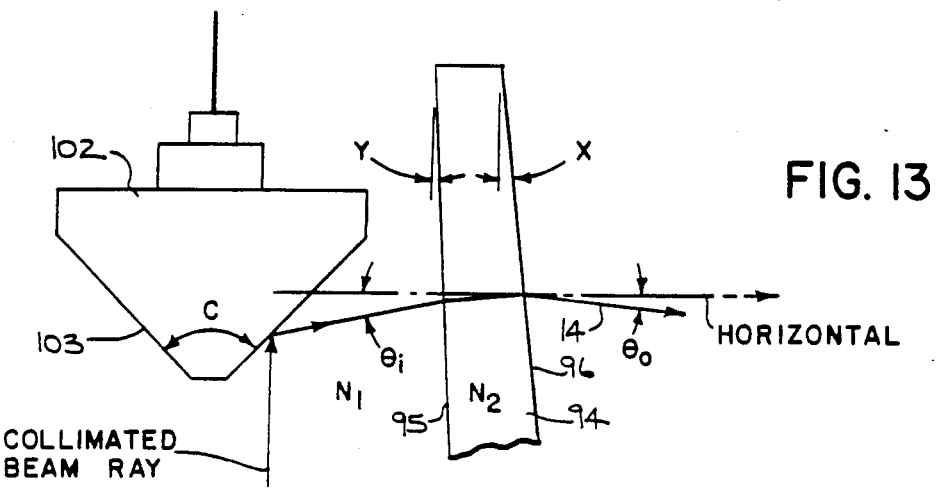
FIG. 13 is a schematic ray diagram for a portion of the reflector assembly.

For the typical use where instrument tilt of lighthouse assembly 26 is zero (the collimated beam and bob 102 axis are vertical), the collimated ray of FIG. 13 impinges on the surface 103 whose angle to the axis of bob 102 is preferably less than 45° (the bob 102 apex angle "C" also being less than 90°) which results in a reflected ray making an angle $\theta_i$ with the horizontal. Wall 95 is inclined at an angle Y with the vertical. The reflected ray (cone of light) is refracted by housing 94 and emerges as the non-planar reference cone 14 at an angle $\theta_o$ with the horizontal, depending on the small angle relationship derived by Snell's Law:

$$\theta_o = n_1\theta_i - (n_1-1)Y - (n_2-1)(X-Y)$$

where $n_1$, $n_2$, X and Y are defined hereafter in this disclosure. Angle "C", $n_1$, $n_2$, X and Y are chosen in a manner to minimize temperature effects and to place $\theta_o$ slightly below horizontal in order to form the non-planar reference cone 14 which positions each point along the reference cone substantially equidistant from the earth.

If a horizontal reference plane were formed rather than a non-planar reference cone, at 1,000 ft. the alignment error would be 0.284 inches and the angular error 0.0000234 radians. Significantly, the non-planar reference cone 14 is a more accurate alignment guide than a horizontal plane.

One problem is that the indices of refraction of the fluid 130 and housing 94 vary with temperature. That is, for a given cone angle, inner surface angle and outer surface angle that provides an emerging reference cone 14 at a certain angle $\theta_o$ at one temperature, the emerging cone may not be at $\theta_o$ at another temperature. Since the transmitter 10 must be capable of operating over a range of temperatures and small errors in the level of the emerging reference cone produce larger errors in reference measurements, it is desirable to minimize temperature effects on the angle of the outgoing reference cone 14.

Therefore, the inner 95 and outer 96 surface angles are matched to minimize temperature dependence on the angle of the emerging reference cone 14. The angles X and Y of the respective outer and inner surfaces as shown in FIG. 13 are chosen to fulfill the relationship:

$$\left\{ \frac{n_2}{n_1} \sin\left[ Y - X - \frac{\sin(\theta_o + X)}{n_2} \sin^{-1} \right] \right\} \sin^{-1} =$$

$$\left\{ \frac{N_2}{N_1} \sin[Y - X - \sin(\theta_o + X) \sin^{-1}] \right\} \sin^{-1}$$

where
- $n_1$ = the index of refraction of the fluid 130 at a first temperature,
- $n_2$ = the index of refraction of the housing 94 at the first temperature,
- $N_1$ = the index of refraction of the fluid 130 at a second temperature, and
- $N_2$ = the index of refraction of the housing 94 at the second temperature.

Preferably, the first and second temperatures should be chosen at the ends of the expected operating temperature range of the transmitter 10.

Once values of X and Y are determined that satisfy the above relationship, the angle $\theta_i$ is determined according to the small angle relationship given above.

Then the included angle C of the conical surface can be solved for as follows:

$$C = 90° - \theta_i$$

As the temperature changes, the buoyancy of the fluid 130 also changes. Changes in the buoyancy of the fluid 130 affect the weight of the bob/strand assembly which changes the angle of $\theta_i$. This change in buoyancy should also be accounted for in selecting the angles X and Y of the respective outer and inner walls to minimize the effects of temperature on the performance of the transmitter 10.

The change $\Delta\theta_i$ in the angle $\theta_i$ attributable to a change in buoyancy as the temperature goes from the first temperature to the second temperature can be calculated by subtracting the angle $\theta_{is}$ at the second temperature from the angle $\theta_{if}$ at the first temperature. Values for X and Y are then chosen to fulfill the relationship:

$$\left\{ \frac{n_2}{n_1} \sin\left[ Y - X - \frac{\sin(\theta_o + X)}{n_2} \sin^{-1} \right] \right\} \sin^{-1} -$$

$$\left\{ \frac{N_2}{N_1} \sin\left[ Y - X - \frac{\sin(\theta_o + X)}{N_2} \sin^{-1} \right] \right\} \sin^{-1} = \Delta\theta_i$$

Once values for X and Y are determined, the cone angle C is determined as above, preferably for the most common temperature at which the transmitter is expected to operate.

The deflection characteristics of the bob 102 are only linear over a certain range. Outside of that range, the deflection of the bob will not be substantially one-half of the error from plumb so that the outgoing radiation reference cone will deviate from its proper orientation. Therefore, another aspect of the invention is to provide means for detecting when the bob 102 is outside of an acceptable deflection range.

Figure 15:
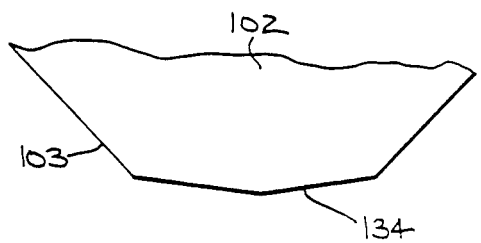
FIG. 15 is a detail view of the tip of a bob for the reflector assembly.

In the embodiment shown in FIG. 14, a pair of detectors 132 (FIG. 6) are provided in the base of the lower housing 30 and are arranged about the longitudinal axis of the lower housing 30 at a right angle to one another. The detectors 132 detect radiation propagating in a downward direction. Referring to FIG. 15, a small reflecting cone 134 (shown exaggerated) is formed on the lower end of the bob 102. The cone 134 reflects the substantially collimated beam back through the collimating lens assembly 70 and the steering window 44 to provide a ring of radiation which normally falls upon the detectors 132 to activate them.

Each detector 132 is covered with a mask 136 (FIG. 6) which has an aperture 137 formed in it over the active area of the detector 132. Each mask 136 is resilient and is mounted to the lower housing with a screw 139. Another screw 140 is used to adjust the location of the aperture 137 over the active area of the detector 132. The aperture 137 in each mask 136 is sized and each mask 136 is adjusted so that when the deflection of the bob 102 exceeds the linear deflection range, the energy received by at least one of the detectors 132 will be sufficiently diminished to deactivate the detector. Deactivation of at least one of the detectors 132 can then be used to generate a signal to a human operator that the transmitter 10 is out of level. See U.S. patent application Ser. No. 788,764, referred to above, for a complete description of how the signal is communicated to the operator.

In another embodiment, only one detector 132 is used. In this embodiment, the end of the bob 102 is sliced off at an angle to provide a nearly circular flat reflecting surface 139 as shown (exaggerated) in FIG. 16. The flat, angled surface provides a generally circular spot of radiation at the single detector 132 adjacent to the emitter 34. The aperture 137 is sized and the mask 136 is adjusted to deactivate the detector when the spot deviates sufficiently as the bob 102 deflects out of the linear range.

Figure 16:
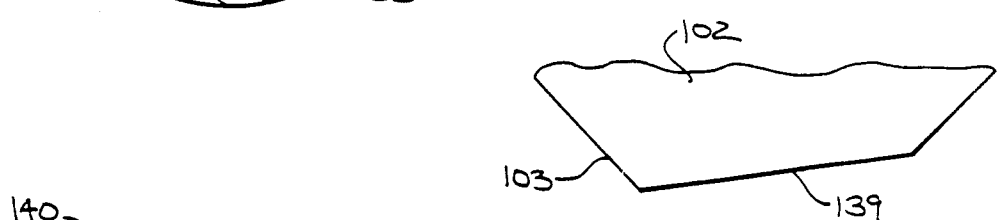
FIG. 16 is a detail view similar to FIG. 15 but showing an alternate embodiment.
Figure 17:
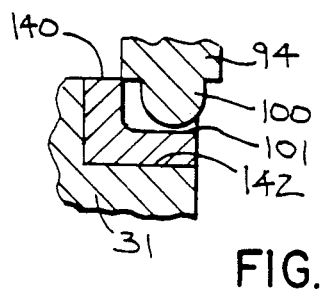
FIG. 17 is a detail view of an alternate embodiment of the lighthouse assembly which is intended to be incorporated with the embodiment of FIG. 16.

In the embodiment of FIG. 16, the spot of radiation must be radially aligned with the detector 132. To enable radial alignment, the grooves 101 can be formed in an annular ring 140 which is rotatable in an annular groove 142 at the top of the upper housing 31. When the angular alignment is completed by turning the reflector assembly 28 relative to the source 27, the screws 90 are tightened to clamp the reflector assembly in position.

Figure 27:
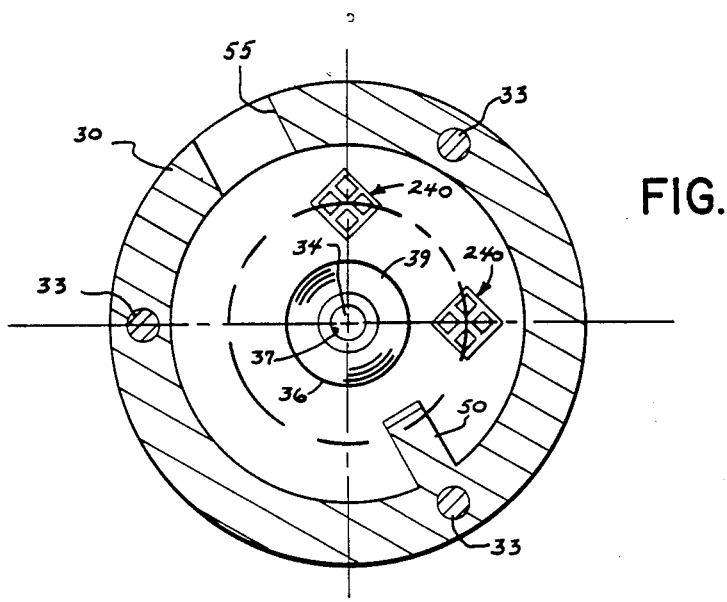
FIG. 27 is a view similar to FIG. 14 but showing another embodiment of an arrangement of out of level detectors for the transmitter.
Figure 28:
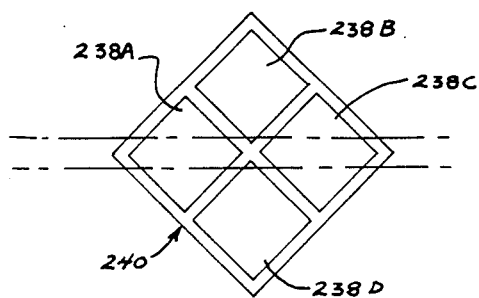
FIG. 28 is a detail view of one of the detectors of FIG. 27 shown with a band of radiation (in phantom) in a level position.
Figure 29:
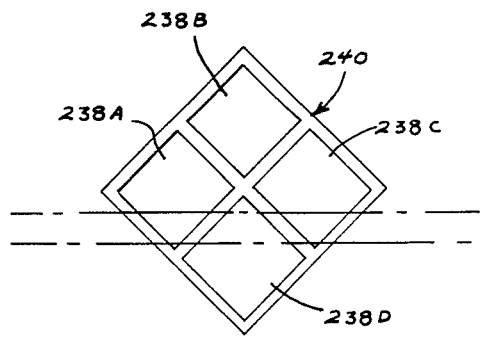
FIG. 29 is a view similar to FIG. 28 but with the band of radiation in an out of level position.

The presently preferred embodiment for detecting when the bob is outside of an acceptable deflection range is shown in FIGS. 27-29. In this embodiment, four square detectors 238A, B, C and D are arranged in a square pattern in a quad cell detector 240. Two quad cells 240 are provided arranged about the longitudinal axis of the lower housing 30 at a right angle to one another with radii of the housing passing through each quad cell diagonally. As in the embodiment of FIGS. 14 and 15, the bob reflects a ring of radiation back to the detectors.

When the transmitter is level, the ring of radiation, which appears straight because the quad cell 240 is so small compared to the radius of the ring, is aligned to fall on the detectors 238A and 238C diagonally as shown in FIG. 28 by the phantom lines. In this position, a relatively large area of the cells 238A and 238C is radiated and only the very inside corners of the detectors 238B and 238D are. If the transmitter moves out of level, the ring correspondingly shifts to illuminate more area of the detectors 238B or 238D and less of the detectors 238A and 238C as shown in FIG. 29. This arrangement is presently preferred because stray reflected light falling on the detectors 238A and 238C substantially equals that falling on the detectors 238B and 238D such that noise is cancelled.

A simple circuit to cancel the noise is for the detectors 238A and 238C to generate the input for the positive side of a differential amplifier while the detectors 238B and 238D provide the input for the negative side. When the amplifier output drops below a certain level, a signal is generated that the deflection of the bob is outside of an acceptable range. Because the areas and sensitivities of the detectors 238A-D are approximately equal, uniform illumination (noise) is cancelled by the differential amplifier and only the difference between the signals is amplified. In addition, using a modulated light signal as described in U.S. patent application Ser. No. 788,764, referred to above, noise can be further distinguished from signal by amplifying only modulated light and synchronously demodulating the resulting signal.

Figure 30:
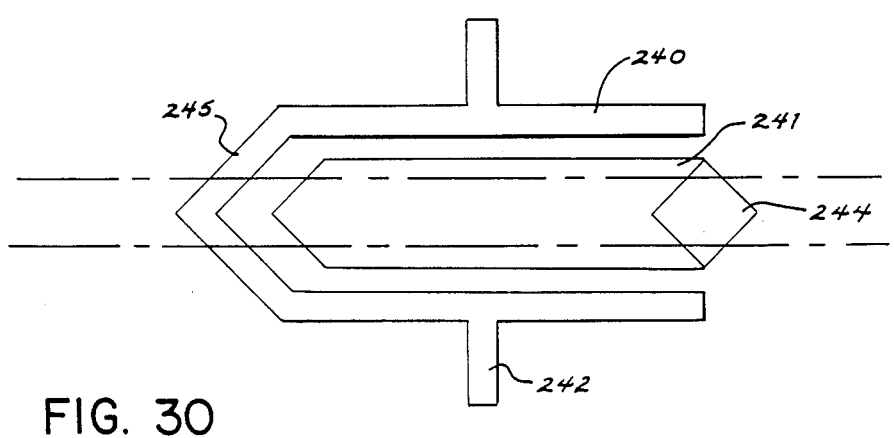
FIG. 30 is a detail view of an alternate embodiment of a detector which could be substituted for the detector of FIG. 28.

Another detector embodiment using the same basic idea of cancelling stray light to improve the signal to noise ratio is shown in FIG. 30. This arrangement may be even more effective to accomplish this objective than the quad cell arrangement of FIGS. 27-29 because the transition from one detector area to another is more abrupt. In this structure, three detector areas 240, 241 and 242 are provided. Areas 240 and 242 are T-shaped and area 241 is between them and bar shaped, being substantially equal in area to the combined areas of 240 and 242. Metalized areas 244 and 245 can be provided to allow connecting a conductor to the area 241 and to the areas 240 and 242, respectively, and to electrically connect the areas 240 and 242.

Two of these structures including the areas 240, 241 and 242 could be provided arranged at right angles to one another about the axis of the lower housing 30. When perfectly level, the ring of radiation would strike the area 241 as shown by phantom lines in FIG. 30. When out of level, the ring would move onto one of the areas 240 or 242. With the area 241 providing the input to the positive side of a differential amplifier and the areas 240 and 242 the negative input, when the output of the amplifier dropped below a certain level, a signal would be generated that the deflection of the bob was outside of an acceptable range.

In the field, the transmitter 10 need only be leveled to within the linear range of the deflection of the bob 102. This degree of accuracy is attainable by adjusting knurled thumbwheels 145 (FIG. 5) until the bubble-type level indicator 22 indicates the transmitter 10 is level. Turning of each thumbwheel 145 turns a screw 146 which is threaded in the chassis 16. The screw 146 has a domed end 148 captured between plates 149 and 150 which are secured together. A ball 151 facilitates turning of the thumbwheel 145 and a threaded sleeve 152 may conveniently be provided as part of the plate 149 to mount the base 18 on the tripod 12.

Figure 18:
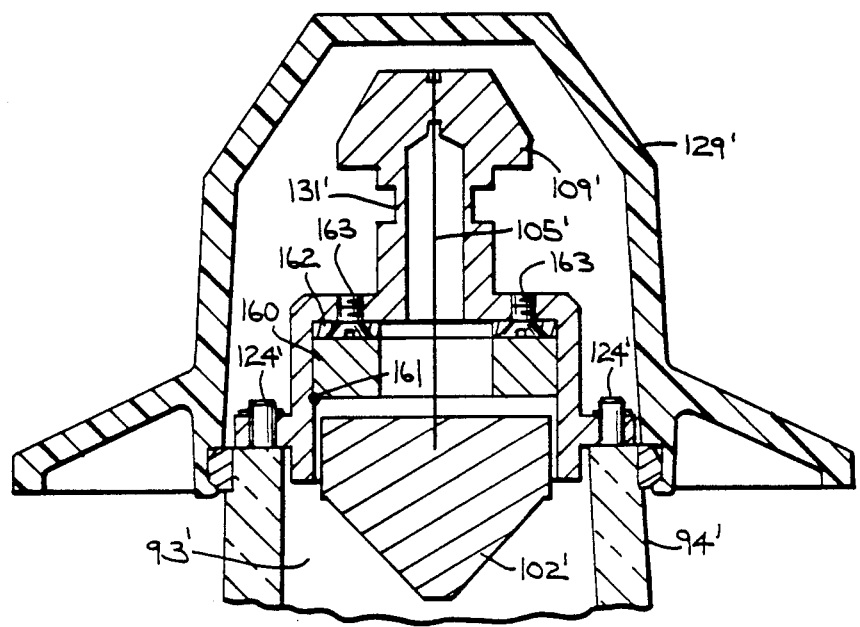
FIG. 18 is a fragmentary sectional view illustrating a preferred damping means for the bob.
Figure 19:
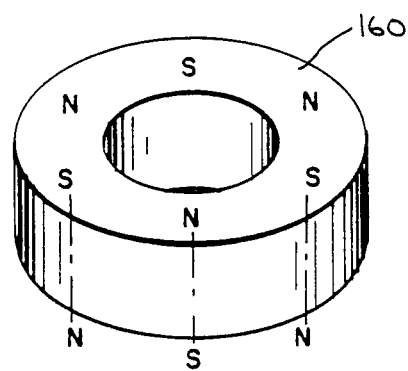
FIG. 19 is a perspective schematic view of a magnet for the damping means of FIG. 18.

A preferable embodiment for damping the movement of the bob 102' is shown in FIG. 18. It does not have the fluid 130 but instead employs magnetics to dampen the movement of the bob 102'. It includes an annular ceramic magnet 160 (FIG. 19) which is glued in place at 161 above the bob 102'. The magnet 160 has six poles of equal magnitude spaced equally on each of its faces. Directly below each pole on a face, an opposite pole exists. Above the magnet 160 is a keeper ring 162 secured to the cap 109' by screws 163. The keeper ring 162 is made of a ferro-magnetic material which provides a low reluctance path for the magnetic field. Note that the cap 109' and the sunshade 129' have been modified somewhat to accommodate the magnet damping means.

The magnet 160 generates magnetic flux lines which extend down into the bob 102'. Since the bob 102' is made of a conductive material, as it moves electric eddy currents are generated in it. These currents develop magnetic fields which oppose the magnetic field generated by the magnet 160. The opposing magnetic fields provide resistance to motion, thereby damping oscillations of the bob 102'.

By using the magnetic damping means described above, the fluid 130 is not necessary. Therefore, the radiation passes through air in the inner space 93'. This simplifies the ray diagram analysis inasmuch as $n_1$ or $N_1$ in the equations given above would be the index of refraction for air, which is about 1.0. Also, bouyant effects on the bob 102' can be neglected for the magnetic damping arrangement.

Also, in the embodiment of FIG. 18, the strand 105' is secured to the bob 102' and the cap 109' somewhat differently from the embodiment of FIG. 6. In the embodiment of FIG. 18, the strand 105' is pressed directly into the cap 109' and into the bob 102'. The holes in the cap 109' and the bob 102' for receiving the strand 105' are sized slightly smaller in diameter than the strand 105'. The ends of the strand 105' are then pushed into the respective holes a small length at a time to keep the strand 105' from buckling as it is pushed in.

Presently, the commercial embodiment contemplated for damping the movement of the bob has eight discrete magnets 248 (FIG. 31) of alternating polarity appropriately retained in a circle above the bob. This arrangement is essentially equivalent in operation to the integral magnetic ring of FIG. 19, but provides a stronger magnetic field to damp movements of the bob.

In this embodiment, other joints have been found preferable to secure the upper and lower ends of the strand. Referring to FIGS. 31–33, the upper end of the strand 105" is secured to the cap 109" by a clamping structure which grips the strand along three lines of contact parallel to the strand's axis. The cap 109" is similar to that of FIG. 18 but has a clamping ring 250 formed at its top. The ring 250 has a central bore which receives two halves 252 and 254 of a clamping bushing.

As best shown in FIG. 33, half 252 has a semi-circular groove 255 formed in it to contact the strand 105" along parallel to the axis of the strand. Alternatively, a V-shaped groove 261 as shown in half 252' of FIG. 34 could be used to contact the strand along two lines, among other designs. The half 254 has a flat surface to contact the strand 105" along one line parallel to its axis. The ring 250 is slotted at 256 and tapped to receive a screw 257 which can be tightened to exert pressure on the strand 105" through the halves 252 and 254 in the direction of the forces F shown in FIGS. 33 and 34 along the lines of contact with the strand. The ring 250 is relieved by slots 258 and 259 to allow it to flex inwardly and provide more even pressure. Note also that in this embodiment the strand 105" can be slid up and down between the halves 252 and 254 to adjust its length in calibration before tightening the screw 257.

Referring to FIG. 31, the lower end of the strand 105" is inserted into a pilot hole in a tapered bushing 262 and brazed therein. The bushing 262 matches with a mating tapered bore in a bob 260 into which the bushing is pressed with a controlled press fit so as not to distort the reflective surface of the bob 260.

It is noted that the bob 260 in this embodiment is shaped somewhat differently than in FIG. 18. It has been found that the strand 105" should be connected to the bob 260 near the center of gravity of the bob 260. Also, the magnetic field to damp the movements of the bob 260 should be offset from the axis of the bob to increase the moment arm through which the field acts. Thus, the upper portion of the bob is formed as two flanges 263 and 264 to lower the center of gravity of the bob 260 and yet place the flanges in the magnetic field.

Figure 35:
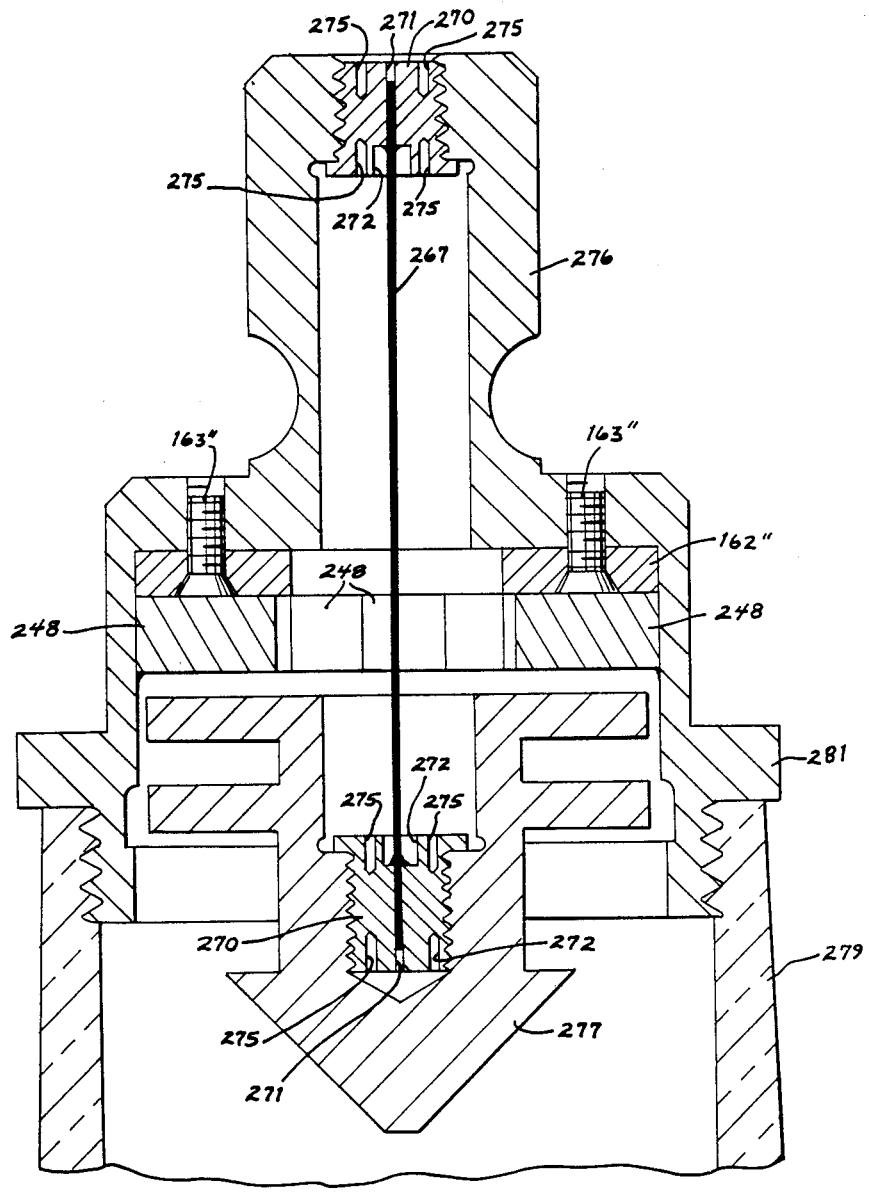
FIG. 35 is a view similar to FIG. 18 but showing another alternate embodiment of connecting the strand to the bob and to the cap.

The presently preferred embodiment for securing the strand to the bob and cap is illustrated in FIG. 35. In this embodiment, a strand 267 is brazed at each end to a screw 270. Each screw 270 has a pilot hole 271 to receive the end of the strand 267 and a recess 272 to house the braze bead. Each end face of the screw 270 is provided with two spaced apart blind bores 275 to receive the prongs of a suitable tool (not shown) to tighten the screw 270 to either the cap 276 or the bob 277. A flange 280 of the screw 270 tightens against a suitable shoulder formed in the cap 276 or the bob 277. This connection is reliable in vibration and impact and does not distort the reflective surface of the bob. Note also that in this embodiment the cap 276 is threaded to the housing 279 with the housing tightening against a flange 281 of the cap.

A transmitter of the invention has now been disclosed. It will be obvious to those of ordinary skill in the art that many other structures could be made which differ from the embodiment described above but still embody the invention. Some of these other structures are discussed below.

Figure 20:
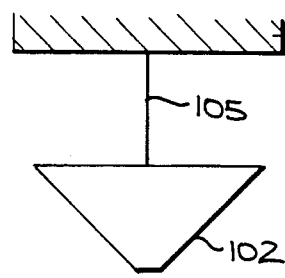
FIG. 20 is a schematic view of the optical compensator for the transmitter of FIGS. 1-19.

As a point of reference, an "optical compensator" portion of the embodiment described above is illustrated schematically in FIG. 20. It should be recognized as the bob 102 suspended from the lower end of the cantilever strand 105 with the upper end fixed to the chassis 16. As stated above, the cantilever strand 105 compensates for angular error in the level of the chassis 16 by causing the bob 102 to deflect angularly from the plumb condition to maintain the orientation of the outgoing reference field in the level condition.

Figure 21:
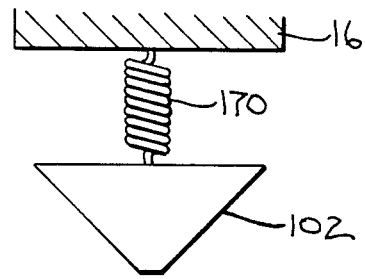
FIG. 21 is a schematic view of a second embodiment of an optical compensator for the transmitter.

One modification of this embodiment which would result in a device within the scope of the invention is shown schematically in FIG. 21. In this embodiment, the cantilever strand is replaced with a coil spring 170. The coil spring would function the same as the cantilever strand because it also has omni-directional stiffness characteristics.

Figure 22:
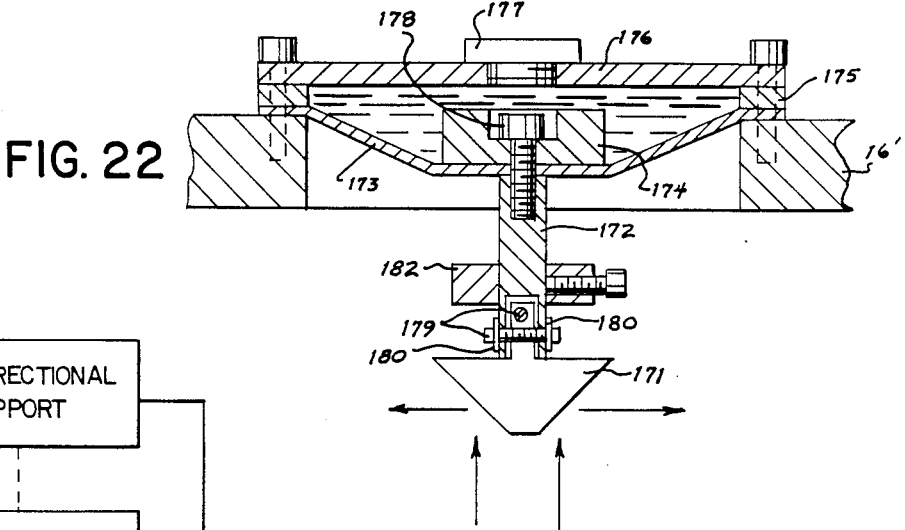
FIG. 22 is a sectional plan view of a third type of an optical compensator for the transmitter.

Another modification is schematically shown in FIG. 22. In this modification, a bob 171 is secured to the lower end of a rigid rod 172 with a pair of shafts 179 which are orthogonal to one another. The shafts 179 are in threaded engagement with the bob 171 and are fixed axially by washers 180 in radial slots in the rod 172. The shafts 179 allow the position of the bob 171 to be calibrated to the energy center of the oncoming substantially collimated beam.

The upper end of the rod 172 sandwiches a thin (typically 0.002 in.) metal diaphragm 173 between it and a clamping member 174. The diaphragm is round and the outer periphery is clamped to the chassis 16' with an annular sealing ring 175 and a cover plate 176. A plug screw 177 in the center of the cover plate allows access to a screw 178 which secures the clamping member 174, diaphragm 173, and rod 172 together. The plug screw 177 also enables the chamber between the diaphragm 173 and cover plate 176 to be filled with a damping liquid such as an oil.

The exact amount of compensation provided by this structure can be adjusted with a weight 182. This weight 182 is moved up or down on the rod 172 to vary the amount the bob 171 deflects for a given angular error of the chassis 16'. Because an excessive deflection of the bob 171 could permanently deform the diaphragm, it is also desirable to provide suitable stops (not shown) to limit the range of travel of the bob 171.

This arrangement also provides omni-directional compensation for an angular error in the orientation of the chassis to maintain the reference field in the level orientation. In addition, damping with a liquid can be used in this embodiment without requiring the radiation to pass through the liquid. Also, in this arrangement, the liquid has no buoyant effect on the bob.

Figure 23:
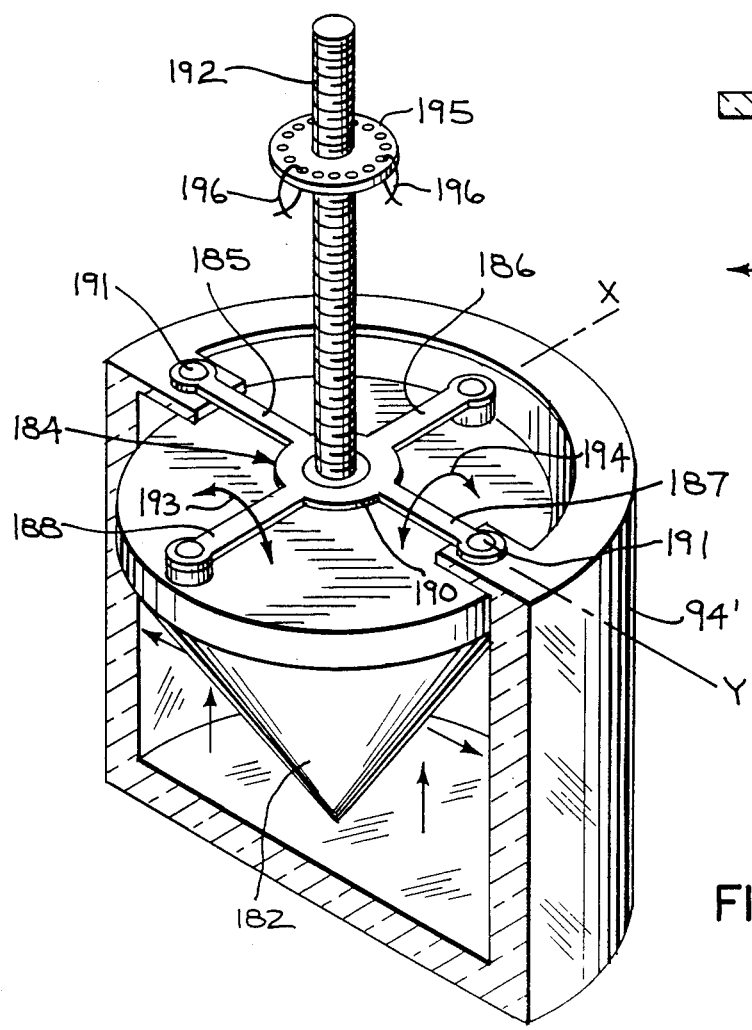
FIG. 23 is a perspective view partially in section of a fourth embodiment of an optical compensator for the transmitter.

A fourth embodiment is schematically illustrated in FIG. 23. In this modification, a double gimbal pivot 184 is used to support a 182. The pivot 184 is a thin piece of sheet metal having four orthogonal arms 185, 186, 187, and 188 connected in the center by an annular ring portion 190. The outer ends of opposed arms 185 and 187 each have a flange which is secured to the bob 182 with an appropriate fastener 191. The outer ends of the other two arms 186 and 188 also are flanged and secured to the housing 94' or other structure fixed to the chassis.

A threaded shaft 192 extends up from the center of the bob 182 on which an off-axis weight 195 is adjustable up and down to vary the effective stiffness of the pivot 184. Also, weights 196 can be added as needed around the outer periphery of the weight 195 to square the axis of the bob 82 with the beam axis. Damping can be provided by submersing the bob 182 in oil as described in connection with the first embodiment or by other appropriate means. Suitable stops (not shown) to limit the range of motion of the bob 182 should also be provided to prevent over-flexing of the pivot 184.

Rotation of the bob 182 about the X-axis causes the arms 186 and 188 to deflect torsionally as illustrated by arrow 193. Rotation about the Y-axis is opposed by torsion in the arms 185 and 187 as depicted by arrow 194. Because each arm has the same torsional stiffness, regardless of the direction of an angular error of the chassis, the bob 182 will deflect the same amount. Hence, this arangement also provides omni-directional compensation for angular errors in the orientation of the chassis to maintain the orientation of the reference field in the level condition.

Figure 24:
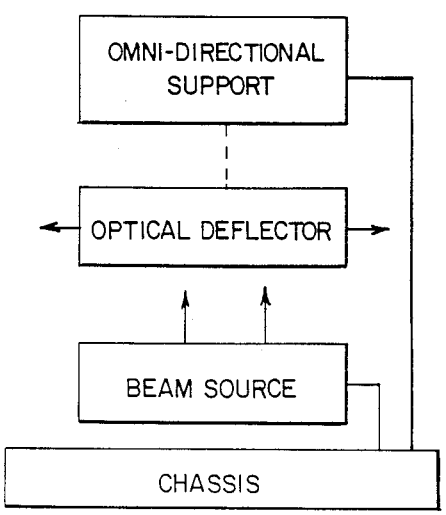
FIG. 24 is a block diagram summary of the optical compensators illustrated in FIGS. 20-23.

All of the embodiments described above are summarized in block diagram form by FIG. 24. As shown and already described with respect to each specific embodiment, these structures have a beam source attached to the chassis positioned below an optical deflector and an omni-directional support attached to the chassis positioned above the optical deflector. The support is connected to the optical deflector (represented by the dashed line) to support the deflector in the beam so that an error in the level orientation of the chassis results in the deflector deviating angularly from the plumb condition an amount and direction to maintain the orientation of the reference field level.

Figure 25:
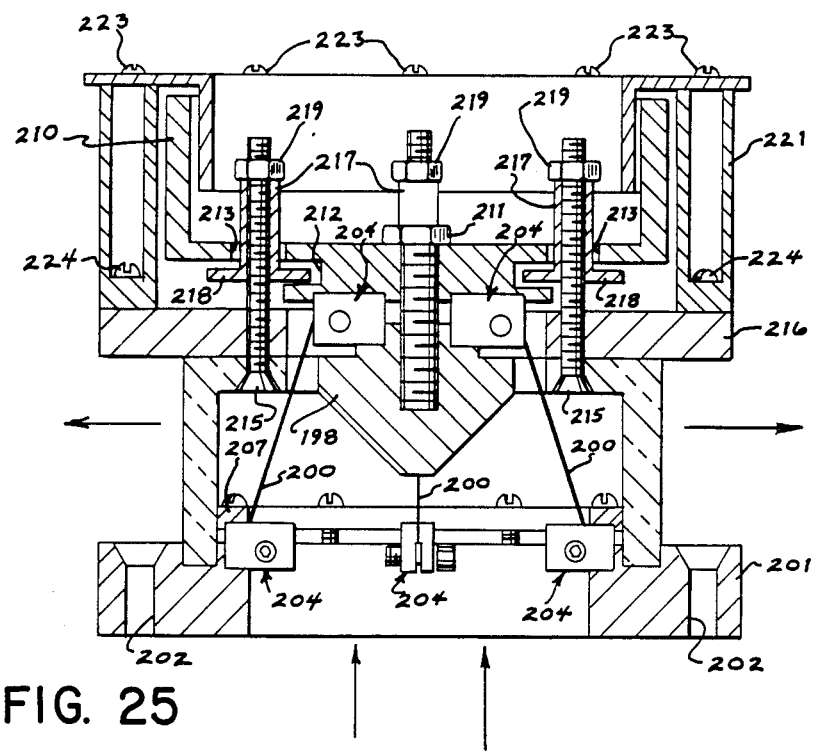
FIG. 25 is a fifth type of an optical compensator for the transmitter.

Yet another embodiment is shown in FIG. 25. This embodiment differs from those described by FIG. 24 because the omni-directional support is below the optical deflector. In this modification, a bob 198 is supported by three equiangularly spaced wires 200 which act as flexible columns. It should be specifically noted as illustrated by this embodiment that the term "bob" is not intended to be limited to an optical deflector which is suspended from above.

An annular ring 201 is fixed to the chassis by appropriate fasteners through bores 202. The lower end of each wire is sandwiched by a clamp 204 which is secured in a recess of the ring 200 by an annular clamping member 207. The upper end of each wire is secured by similar clamps 204 which are secured between the bob 198 and an air damping member 210 which is secured to the bob 198 by a bolt 211 or other appropriate means. An annular groove 212 is provided in the side surface of a lower portion of the damping member 210 and three equiangularly spaced bores 213 are provided through a top flange portion of the damping member 210. A screw 215 secures a platform 216 on the upper surface of a transparent housing 218 which is fixed to the ring 201. The screws 215 extend up through the bores 213 and adjustable stops 217 are threaded onto them and locked with locknuts 219. Each stop 217 has a circular flange 218 which extends into the groove 212 to limit the range of vertical movement of the bob 198.

The outer periphery of the top flange of the member 210 extends upward into an annular space defined by an inner member 220 and an outer member 221. The inner member is secured to the outer member by fasteners 223 and the outer member is secured to the platform with fasteners 224. Movement of the bob 198 causes air to be squeezed out from the small spaces between the member 210 and the inner and outer members 220 and 221 to provide damping in this embodiment.

Figure 36:
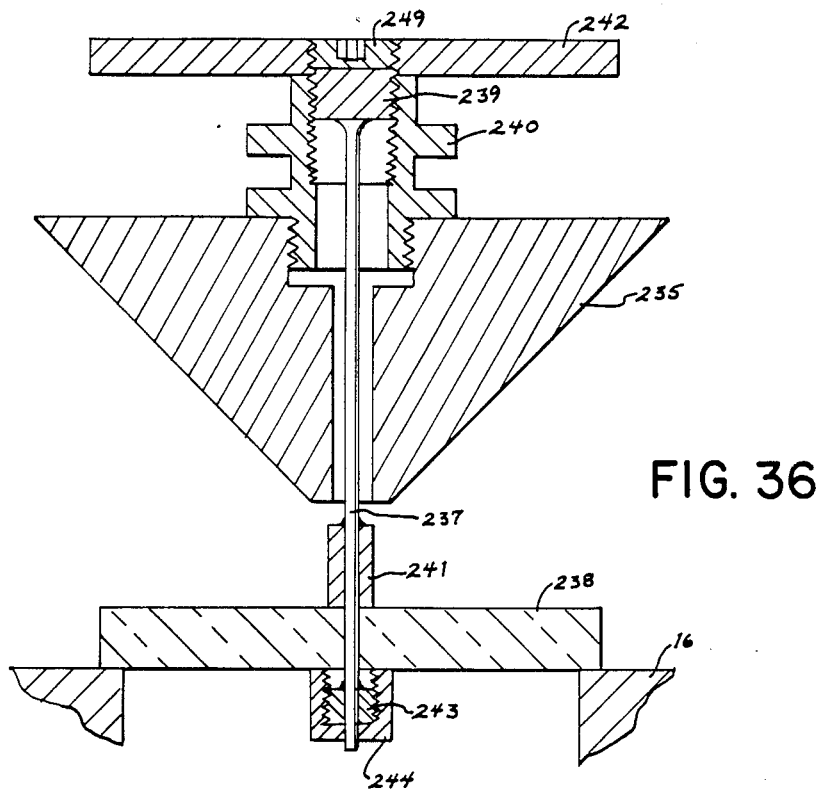
FIG. 36 is a sectional plan view illustrating a seventh type of an optical compensator for the transmitter.

The wires 200 are chosen to provide omni-directional compensation for errors in the level orientation of the chassis to maintain the orientation of the reference field level. The length of each wire for the proper amount of compensation to maintain the level orientation of the reference field is given by the following equation:

$$R^3 = \frac{9\pi\, E\, rd^4}{64 W \cos\phi \sin\phi}$$

where:
r is the radius to the center of the bob
d is the diameter of the wire
W is the weight of the bob
$\phi$ is the angle between the wire and the horizontal
E is the modulus of elasticity of the wire, and
R is the length of the individual wires Another embodiment to support a bob 235 from beneath is illustrated schematically in FIG. 36. In this embodiment, a single slender flexible column 237 extends through and is fixed to a transparent glass plate 238 below the bob 235. The column 237 is fixed to the glass plate 238 by any suitable means, including, for example, an upper lug 241 which is brazed to the column 237, a lower threaded lug 243 which is brazed to the column 237 after it is inserted through the plate 238, and a nut 244 which is snugged up against the plate 238. The plate 238 is in turn fixed to the chassis 16. The column 237 extends up through a central bore in the bob 235 and has a head 239 brazed on it which is threaded into a squaring adjustment 240. The squaring adjustment 240 is threaded into the bob 235 and may be screwed up or down to effectively adjust the flexibility of the column 237. A locking set screw 249 can be provided to hold the adjusted position of the squaring adjustment 240. The squaring adjustment 240 also can be adjusted to center the bob 235 in the oncoming beam and has a flange 242 which adapts it to be used with magnetic damping such as that illustrated in FIG. 35.

Figure 26:
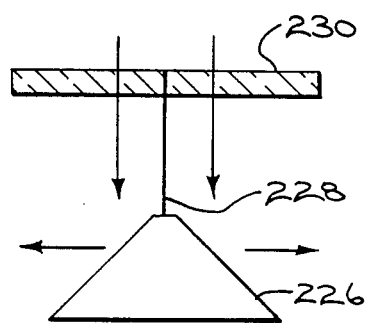
FIG. 26 is a schematic view of a sixth embodiment of an optical compensator for the transmitter.

It is also possible to make a transmitter in accordance with this invention with the source positioned above or in some other position relative to the optical deflector. An illustrative embodiment is shown schematically in FIG. 26. As shown, a bob 226 is turned upside down so that its reflecting surface converges in the upward direction and the beam propagates toward the reflecting surface in the downward direction. The bob 226 is suspended by a cantilever strand 228 from a transparent window 230. A different type of support could also be used with this embodiment, whether from the top or bottom of the optical deflector.

It should also be noted that several different types of optical deflectors could be used. For example, the bob reflecting surface need not be strictly conical but could be shaped to have optical power (e.g., it could have a parabolic or otherwise curved converging reflecting surface). This may be desirable, for example, to cause the outgoing field to converge away from the transmitter to provide a greater density of radiation energy in the field. Also, it would be possible to have the beam converge to a virtual image within the bob, the reflecting surface of the bob being shaped to collimate the beam into the outgoing reference field.

Figure 37:
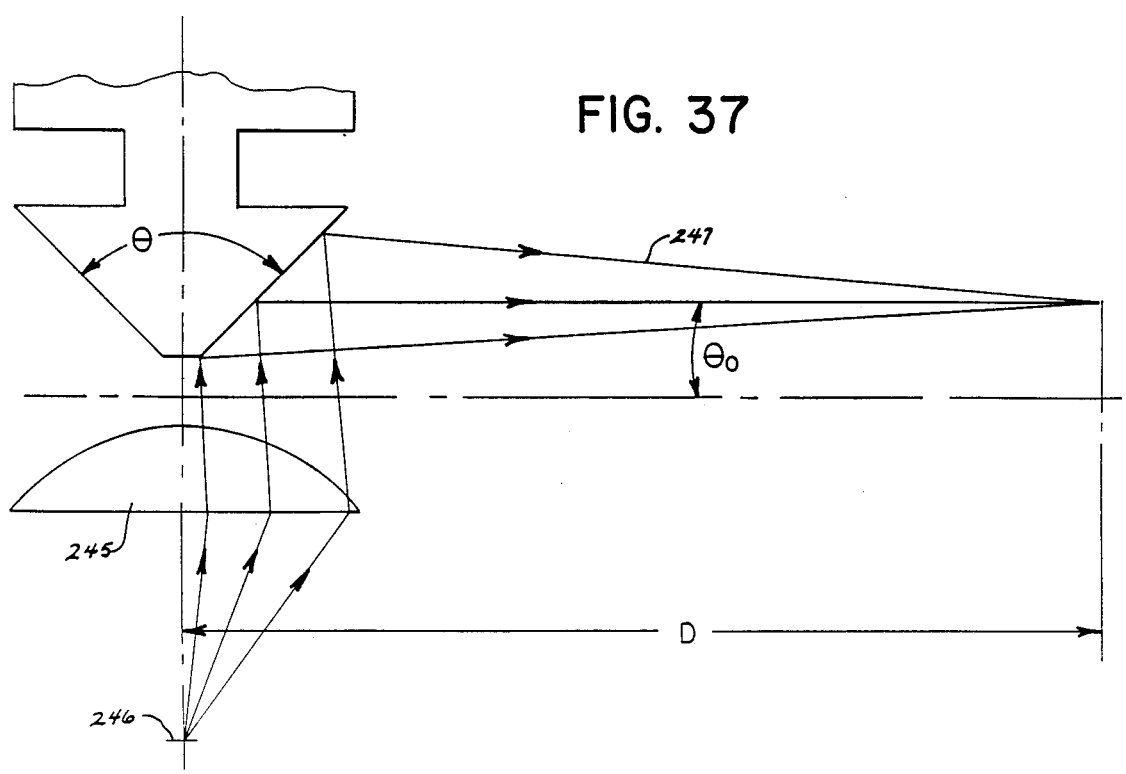
FIG. 37 is a schematic ray diagram illustrating an alternate optical system in which the thickness of the reference field converges.

An especially preferred optical construction utilizing a converging beam is illustrated in FIG. 37. At construction sites where a transmitter of the invention may be used, ground or structural vibrations caused by construction related equipment, for example, earth moving machines, earth and concrete compacting devices, pile drivers and excavators, can affect the generation of a radiation reference field. A small vibration at the transmitter is amplified in the reference field a distance away from the transmitter.

To detect the beam at a distance, a receiver such as that described in U.S. patent application Ser. No. 788,764, referred to above, may use a split photocell detector to establish a balance of illumination on each cell. To accommodate a bouncing field due to transmitter vibration, averaging circuitry may be employed in the receiver. However, this circuitry fails its function and reading errors may occur if the beam bounces beyond the boundaries of the photocell. In addition, a large range of motion of the reference field cannot practically be accommodated by increasing the size of the receiver because the receiver must be kept pocket-sized and also because making the photocell detector taller makes the detector more sensitive to ambient noise such as sunshine or non-filterable fluorescent light.

An alternative schematically illustrated in FIG. 37 converges the thickness of the reference field to a minimum at a certain range of the instrument. A narrow thickness allows more room within the length of the photocell detector to accommodate bouncing of the reference field.

In the embodiment of FIG. 37, a converging lens 245 redirects the diverging emission of a laser diode 246 to be converging. The converging beam from the lens 245 is then reflected by the bob and emanates from the bob in a converging field 247. The field 247 converges to a minimum thickness at a certain distance D from the transmitter, which using a 5 mw laser diode may be 150 ft., the maximum range of the transmitter.

It is especially noted in this embodiment that the converging field also is angled conically downward by an angle $\theta_o$ (approximately 1 arc sec) to horizontal measured at the centroid ray of the field to compensate for the curvature of the earth. The optimal included angle $\theta$ of the bob to accomplish this is 89° 59' 47". Note that although not shown, a transparent housing through which the reference field would pass would surround the bob.

Many more modifications to the preferred embodiment will be apparent to those of ordinary skill in the art but which will still embody the invention. Therefore, the invention is not intended to be limited by the scope of the detailed description or the drawings, but by the claims which follow, except as otherwise required by law.

We claim:

1. A transmitter for an alignment system in which a field of electromagnetic radiation is propagated, said transmitter comprising:
    a chassis;
    means for leveling the chassis;
    a source fixed to the chassis for providing a beam of electromagnetic radiation;
    an optical deflector having a reflecting surface which converges toward the source for redirecting the beam into an omni-directional reference field of radiation; and
    flexible means having an omni-directional stiffness connected to the chassis for supporting the optical deflector within the beam in an aligned position relative to the beam with the chassis level, the beam being redirected omni-directionally by the deflector in the aligned position to define a reference field of radiation in a level orientation;
    wherein an angular error in the orientation of the chassis from level results in the optical deflector deviating from the aligned position to maintain the reference field in the level orientation; and
    wherein the support means includes a cantilever strand having a lower end secured to the optical deflector and an upper end secured to the chassis, the stiffness of the cantilever strand being omni-directional and of a magnitude to provide a deviation of the optical deflector from the aligned position to maintain the reference field in the level orientation.

2. A transmitter for an alignment system in which a field of electromagnetic radiation is propagated, said transmitter comprising:
    a chassis;
    means for leveling the chassis;
    a source fixed to the chassis for providing a beam of electromagnetic radiation;
    an optical deflector having a reflecting surface which converges toward the source for redirecting the beam into an omni-directional reference field of radiation; and
    flexible means having an omni-directional stiffness connected to the chassis for supporting the optical deflector within the beam in an aligned position relative to the beam with the chassis level, the beam being redirected omni-directionally by the deflector in the aligned position to define a reference field of radiation in a level orientation;
    wherein an angular error in the orientation of the chassis from level results in the optical deflector deviating from the aligned position to maintain the reference field in the level orientation; and
    wherein the support means includes a coil spring having a lower end secured to the optical deflector and an upper end secured to the chassis, the stiffness of the coil spring being omni-directional and of a magnitude to provide a deviation of the optical deflector from the aligned position to maintain the reference field in the level orientation.

3. A transmitter for an alignment system in which a field of electromagnetic radiation is propagated, said transmitter comprising:
    a chassis;
    means for leveling the chassis;
    a source fixed to the chassis for providing a beam of electromagnetic radiation;
    an optical deflector having a reflecting surface which converges toward the source for redirecting the beam into an omni-directional reference field of radiation; and
    flexible means having an omni-directional stiffness connected to the chassis for supporting the optical deflector within the beam in an aligned position relative to the beam with the chassis level, the beam being redirected omni-directionally by the deflector in the aligned position to define a reference field of radiation in a level orientation;

wherein an angular error in the orientation of the chassis from level results in the optical deflector deviating from the aligned position to maintain the reference field in the level orientation; and wherein the support means includes:

a flexible diaphragm having an outer periphery secured to the chassis above the optical deflector; and a rod having a lower end secured to the optical deflector and an upper end secured to the flexible diaphragm;

wherein the stiffness of the diaphragm is omni-directional and of a magnitude to provide a deviation of the optical deflector from the aligned position to maintain the reference field in the level orientation.

4. A transmitter as in claim 3, further comprising:

means for defining a sealed chamber above the diaphragm; and a liquid in the chamber to damp movements of the optical deflector.

5. A transmitter for an alignment system in which a field of electromagnetic radiation is propagated, said transmitter comprising:

a chassis;

means for leveling the chassis;

a source fixed to the chassis for providing a beam of electromagnetic radiation;

an optical deflector having a reflecting surface which converges toward the source for redirecting the beam into an omni-directional reference field of radiation; and flexible means having an omni-directional stiffness connected to the chassis for supporting the optical deflector within the beam in an aligned position relative to the beam with the chassis level, the beam being redirected omni-directionally by the deflector in the aligned position to define a reference field of radiation in a level orientation;

wherein an angular error in the orientation of the chassis from level results in the optical deflector deviating from the aligned position to maintain the reference field in the level orientation; and wherein the support means comprises a double gimbal pivot having two pairs of orthogonal arms, one said pair being fixed to the chassis and the other said pair being fixed to the optical deflector; and wherein the stiffness of the double gimbal pivot is omni-directional and of a magnitude to provide a deviation of the optical deflector from the aligned position to maintain the reference field in the level orientation.

6. A transmitter for an alignment system in which a field of electromagnetic radiation is propagated, said transmitter comprising:

a chassis;

means for leveling the chassis;

a source fixed to the chassis for providing a beam of electromagnetic radiation;

an optical deflector having a reflecting surface which converges toward the source for redirecting the beam into an omni-directional reference field of radiation; and flexible means having an omni-directional stiffness connected to the chassis for supporting the optical deflector within the beam in an aligned position relative to the beam with the chassis level, the beam being redirected omni-directionally by the deflector in the aligned position to define a reference field of radiation in a level orientation;

wherein an angular error in the orientation of the chassis from level results in the optical deflector deviating from the aligned position to maintain the reference field in the level orientation; and wherein the support means comprises at least three flexible support members, each said support member connected at an upper end to the optical deflector and at a lower end to the chassis, the stiffness of said support members being omni-directional and of a magnitude to provide a deviation of the optical deflector from the aligned position to maintain the reference field in the level orientation.

7. A transmitter as in claim 6, further including means for providing air damping of movements of the optical deflector comprising:

means defining an annular surface; and means connected to the optical deflector proximate to the annular surface to provide said air damping.

8. A transmitter for an alignment system in which a field of electromagnetic radiation is propagated, said transmitter comprising:

a chassis;

means for leveling the chassis;

a source fixed to the chassis for providing a beam of electromagnetic radiation;

an optical deflector having a reflecting surface which converges toward the source for redirecting the beam into an omni-directional reference field of radiation; and flexible means having an omni-directional stiffness connected to the chassis for supporting the optical deflector within the beam in an aligned position relative to the beam with the chassis level, the beam being redirected omni-directionally by the deflector in the aligned position to define a reference field of radiation in a level orientation;

wherein an angular error in the orientation of the chassis from level results in the optical deflector deviating from the aligned position to maintain the reference field in the level orientation; and wherein the support means comprises a flexible columnar support connected at one end to the chassis and at the other end to the optical deflector.

9. A transmitter for an alignment system in which a field of electromagnetic radiation is propagated, said transmitter comprising:

a chassis;

means for leveling the chassis;

a source fixed to the chassis for providing a beam of electromagnetic radiation;

an optical deflector having a reflecting surface which converges toward the source for redirecting the beam into an omni-directional reference field of radiation; and flexible means having an omni-directional stiffness connected to the chassis for supporting the optical deflector within the beam in an aligned position relative to the beam with the chassis level, the beam being redirected omni-directionally by the deflector in the aligned position to define a reference field of radiation in a level orientation;

wherein an angular error in the orientation of the chassis from level results in the optical deflector deviating from the aligned position to maintain the reference field in the level orientation; and wherein the optical deflector redirects the beam: into a reference field of radiation which is conical in shape and is directed downwardly away from the transmitter.

10. A transmitter as in claim 9, wherein the thickness of the reference field converges.

11. A transmitter for an alignment system in which a field of electromagnetic radiation is propagated, said transmitter comprising:
   a chassis;
   means for leveling the chassis;
   a source fixed to the chassis for providing a beam of electromagnetic radiation;
   an optical deflector having a reflecting surface which converges toward the source for redirecting the beam into an omni-directional reference field of radiation; and
   flexible means having an omni-directional stiffness connected to the chassis for supporting the optical deflector within the beam in an aligned position relative to the beam with the chassis level, the beam being redirected omni-directionally by the deflector in the aligned position to define a reference field of radiation in a level orientation;
   wherein an angular error in the orientation of the chassis from level results in the optical deflector deviating from the aligned position to maintain the reference field in the level orientation;
   wherein movements of the deflector are damped by a fluid; and
   further comprising a transparent housing surrounding the optical deflector and wherein the fluid is a liquid which immerses the optical deflector in the housing.

12. A transmitter as in claim 11, wherein the housing has inner an outer conical surfaces, the relationship between the surface being such that temperature effects on the orientation of the reference field are minimized.

13. A transmitter for an alignment system in which a field of electromagnetic radiation is propagated, said transmitter comprising:
   a chassis;
   means for leveling the chassis;
   a source fixed to the chassis for providing a beam of electromagnetic radiation;
   an optical deflector having a reflecting surface which converges toward the source for redirecting the beam into an omni-directional reference field of radiation; and
   flexible means having an omni-directional stiffness connected to the chassis for supporting the optical deflector within the beam in an aligned position relative to the beam with the chassis level, the beam being redirected omni-directionally by the deflector in the aligned position to define a reference field of radiation in a level orientation;
   wherein an angular error in the orientation of the chassis from level results in the optical deflector deviating from the aligned position to maintain the reference field in the level orientation; and
   further comprising magnet means for damping movements of the optical deflector.

14. A transmitter as in claim 13, wherein the magnet means produce eddy currents in the optical deflector to damp movements of the optical deflector.

15. A transmitter for an alignment system in which a field of electromagnetic radiation is propagated, said transmitter comprising:
   a chassis;
   means for leveling the chassis;
   a source fixed to the chassis for providing a beam of electromagnetic radiation;
   an optical deflector having a reflecting surface which converges toward the source for redirecting the beam into an omni-directional reference field of radiation; and
   flexible means having an omni-directional stiffness connected to the chassis for supporting the optical deflector within the beam in an aligned position relative to the beam with the chassis level, the beam being redirected omni-directionally by the deflector in the aligned position to define a reference field of radiation in a level orientation;
   wherein an angular error in the orientation of the chassis from level results in the optical deflector deviating from the aligned position to maintain the reference field in the level orientation; and
   further comprising sensor means for detecting when the angular error in the orientation of the chassis from level is outside of an acceptable range.

16. A transmitter as in claim 15, wherein the sensor means comprises:
   detector means spaced a distance away from the optical deflector; and
   a reflector surface on the optical deflector for directing electromagnetic radiation to the detector means in an amount sufficient to activate the detector means in the acceptable range but not outside of the acceptable range.

17. A transmitter as in claim 16, wherein:
   the detector means comprises a pair of detectors disposed orthogonally to one another; and
   the reflector surface on the optical deflector is conically shaped to reflect a ring of radiation back to the detectors.

18. A transmitter as in claim 16, wherein:
   the detector means comprises a single detector; and
   the reflector surface on the optical deflector is a planar surface to reflect a spot of radiation back to the detector.

19. A transmitter for an alignment system in which a field of electromagnetic radiation is propagated, said transmitter comprising:
   a chassis;
   means for leveling the chassis;
   a source fixed to the chassis for providing a beam of electromagnetic radiation;
   an optical deflector having a reflecting surface which converges toward the source for redirecting the beam into an omni-directional reference field of radiation; and
   flexible means having an omni-directional stiffness connected to the chassis for supporting the optical deflector within the beam in an aligned position relative to the beam with the chassis level, the beam being redirected omni-directionally by the deflector in the aligned position to define a reference field of radiation in a level orientation;
   wherein an angular error in the orientation of the chassis from level results in the optical deflector deviating from the aligned position to maintain the reference field in the level orientation; and
   wherein an angular error in the orientation of the chassis from level results in the optical deflector deviating an amount substantially equal to one-half of the engular error from the aligned position to maintain the reference field in the level orientation.

20. A transmitter for an alignment system in which a field of electromagnetic radiation is propagated, said transmitter comprising:

a chassis;

means for leveling the chassis;

a source fixed to the chassis for providing a beam of electromagnetic radiation;

an optical deflector having a reflecting surface which converges toward the source for redirecting the beam into an omni-directional reference field of radiation; and flexible means having an omni-directional stiffness connected to the chassis for supporting the optical deflector within the beam in an aligned position relative to the beam with the chassis level, the beam being redirected omni-directionally by the deflector in the aligned position to define a reference field of radiation in a level orientation;

wherein an angular error in the orientation of the chassis from level results in the optical deflector deviating from the aligned position to maintain the reference field in the level orientation; and further comprising means for causing the thickness of the reference field to converge.

* * * * *